United States Patent
Maeta

(10) Patent No.: US 10,999,521 B2
(45) Date of Patent: May 4, 2021

(54) IMAGING DEVICE AND CONTROL METHOD THEREFOR

(71) Applicant: CANON KABUSHIKI KAISHA, Tokyo (JP)

(72) Inventor: Shinichi Maeta, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/534,501

(22) Filed: Aug. 7, 2019

(65) Prior Publication Data

US 2020/0068109 A1 Feb. 27, 2020

(30) Foreign Application Priority Data

Aug. 27, 2018 (JP) .................................. 2018-158250

(51) Int. Cl.
| | | |
|---|---|---|
| *H04N 5/235* | (2006.01) | |
| *H04N 5/243* | (2006.01) | |
| *H04N 5/3745* | (2011.01) | |
| *H04N 5/378* | (2011.01) | |

(52) U.S. Cl.
CPC ......... *H04N 5/2352* (2013.01); *H04N 5/2354* (2013.01); *H04N 5/2355* (2013.01); *H04N 5/243* (2013.01); *H04N 5/378* (2013.01); *H04N 5/37452* (2013.01)

(58) Field of Classification Search
CPC .. H04N 5/2352; H04N 5/2354; H04N 5/2355; H04N 5/243; H04N 5/37452; H04N 5/378
See application file for complete search history.

(56) References Cited

U.S. PATENT DOCUMENTS

2012/0256077 A1* 10/2012 Yen .................... H04N 5/37452
250/208.1

FOREIGN PATENT DOCUMENTS

JP 2014222899 A 11/2014

* cited by examiner

*Primary Examiner* — Daniel M Pasiewicz
(74) *Attorney, Agent, or Firm* — Carter, Deluca & Farrell LLP

(57) ABSTRACT

An imaging device controls a light emission unit to perform pre-light emission and decides an amount of light emitted in imaging. In a plurality of pixel units included in an image sensor, a switch that connects or does not connect an additional capacitor to a floating diffusion (FD) unit is provided. An amplification unit for a pixel signal can set a plurality of gains. A CPU controls the switch such that the FD unit is connected to the additional capacitor or the FD unit is not connected to the additional capacitor in accordance with an imaging condition. When image data for light modulation is acquired or when image data used for live-view display or recording is acquired, the CPU performs control such that the switch and the amplification unit amplify the pixel signal in different gain settings.

11 Claims, 19 Drawing Sheets

FIG. 10A

STILL IMAGE

HORIZONTAL DIRECTION OF IMAGE SENSOR →

VERTICAL DIRECTION OF IMAGE SENSOR ↓

} READ AT EQUIVALENCE TO ISO100

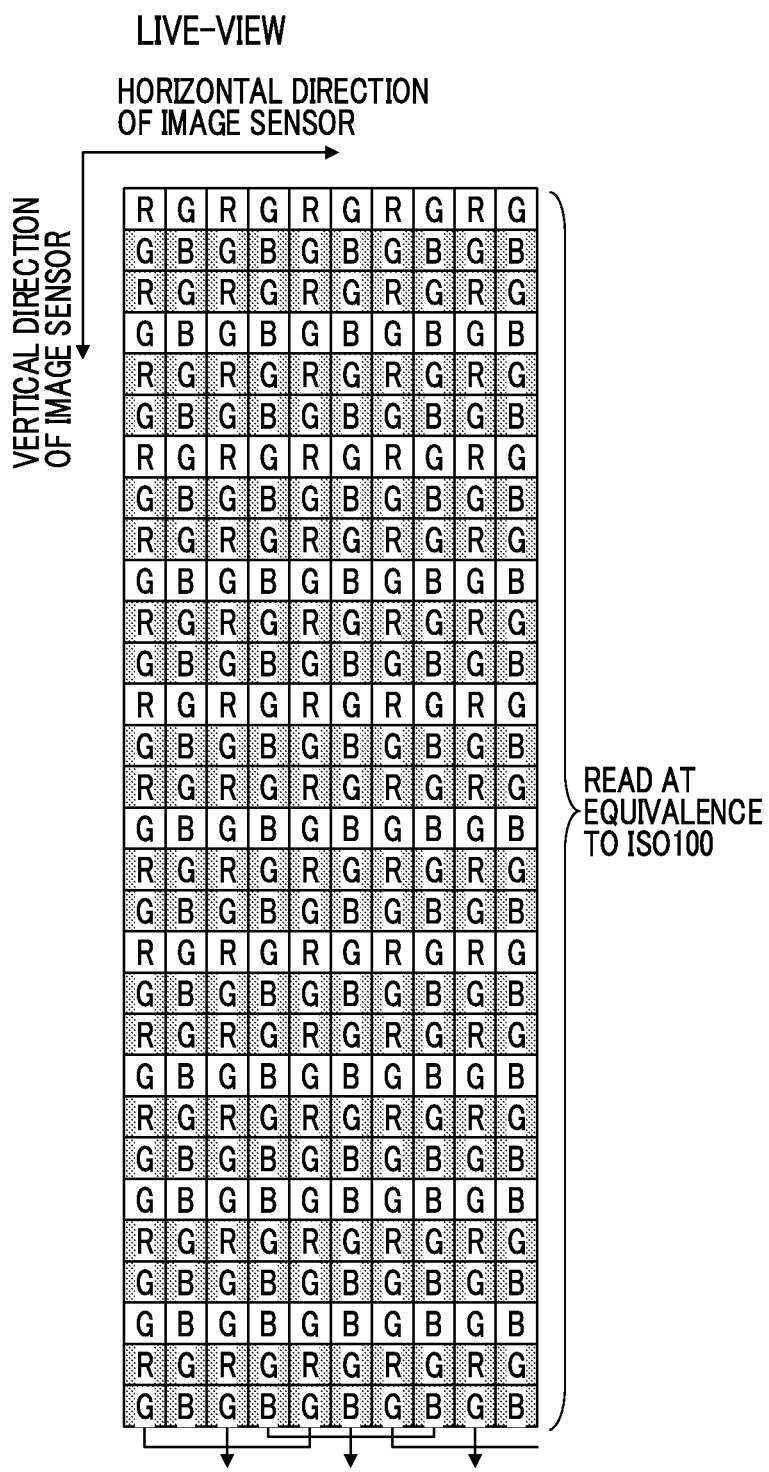

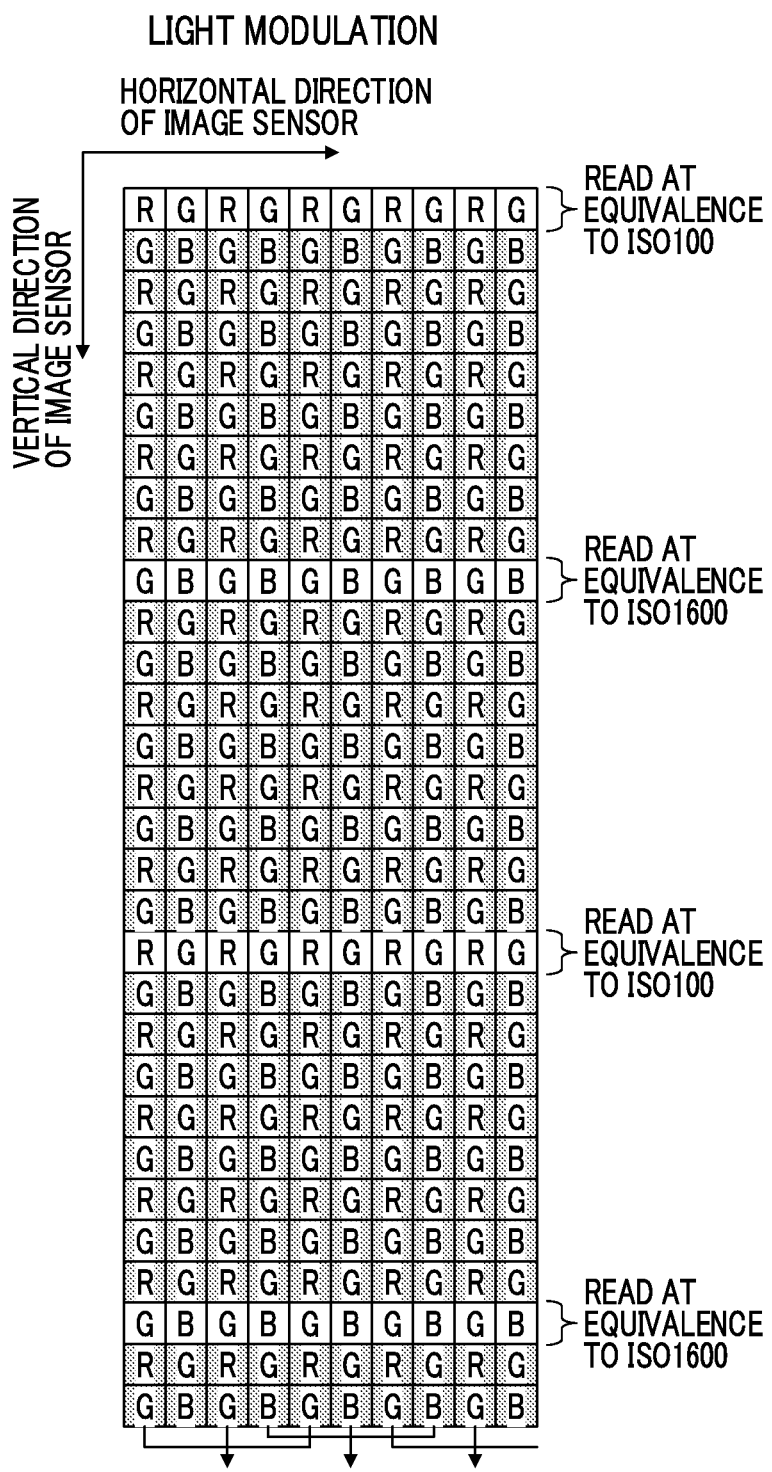

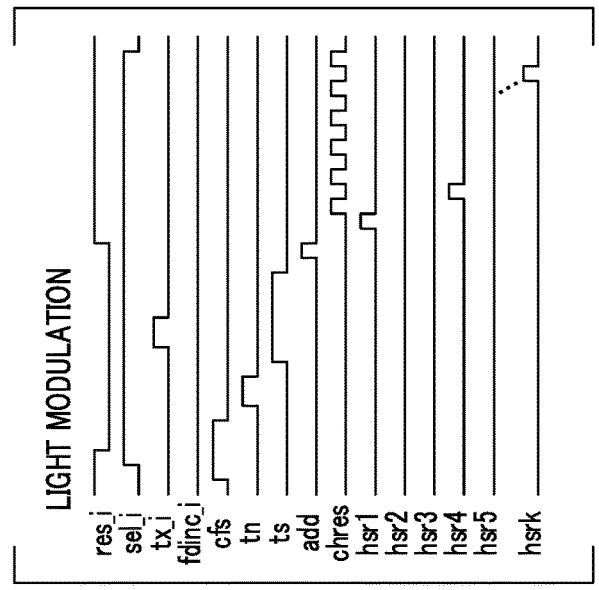
FIG. 13A STILL IMAGE
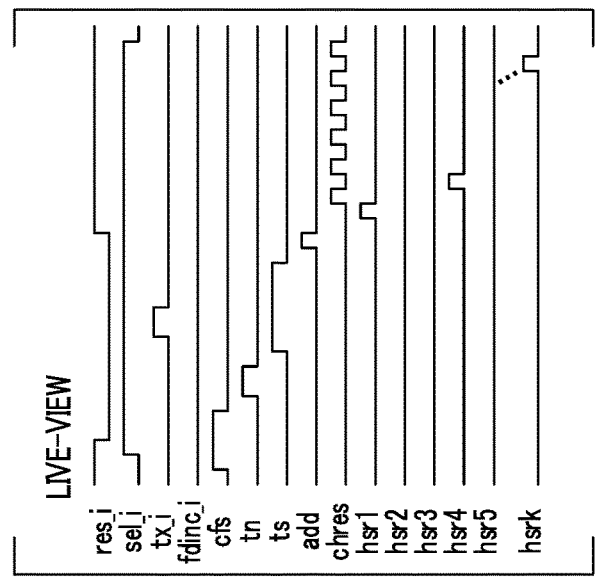
FIG. 13B LIVE-VIEW
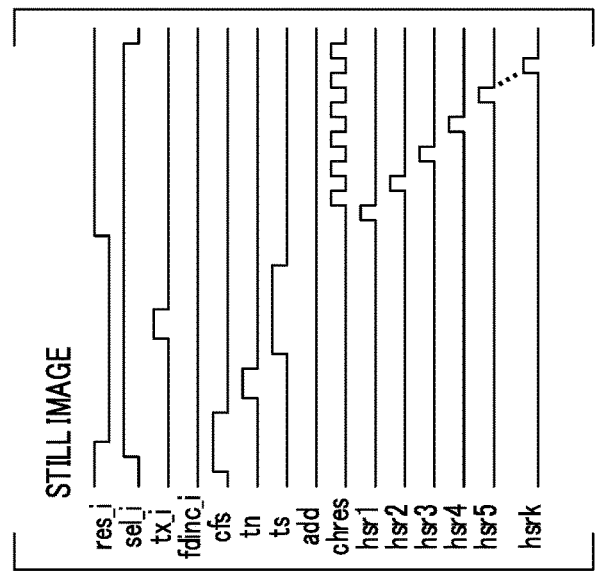
FIG. 13C LIGHT MODULATION

IMAGING DEVICE AND CONTROL METHOD THEREFOR

BACKGROUND OF THE INVENTION

Field of the Invention

The present invention relates to an imaging device and a control method therefor capable of ensuring a dynamic range in accordance with an imaging condition.

Description of the Related Art

As photometric schemes of controlling exposure control of imaging devices, there are a first scheme of performing photometry using a compression system sensor for photometry and a second scheme of performing photometry using a linear system sensor on an imaging surface. The second scheme has a narrower dynamic range (hereinafter also referred to as a DR) in which photometry is possible than the first scheme, and therefore accurate photometry may not be performed on a subject with a large contrast. In particular, when stroboscopic light modulation for calculating an amount of emitted light at the time of photographing is performed in stroboscopic photographing by performing preliminary light emission and performing photometry of light reflected from a subject, an amount of light reflected from the subject considerably differs depending on a photographing scene. Therefore, when an exposure result at the time of the preliminary light emission is not within a dynamic range of the linear system sensor, a so-called underexposure or pixel saturation may occur, and thus accurate photometry may not be performed in one-time exposure.

As a technology for handling the above-described event, in the technology disclosed in Japanese Unexamined Patent Publication No. 2014-222899, image signals multiplied by a plurality of different kinds of gains can be acquired when pixel signals are read once from a pixel array. Thus, it is possible to expand a DR of an image signal output obtained by one-time exposure.

In the technology of the related art disclosed in Japanese Unexamined Patent Publication No. 2014-222899, a dynamic range of data for light modulation can be expanded, but DR expansion of still image data or live-view image data is not mentioned.

SUMMARY OF THE INVENTION

According to an embodiment of the invention, an imaging device is an imaging device that causes a light emission unit to emit light and is able to perform imaging using an image sensor. The imaging device includes: a capacitance varying unit configured to vary electrostatic capacitance with respect to a floating diffusion unit included in each pixel unit of the image sensor; an amplification unit configured to perform amplification in accordance with a plurality of gains set in a pixel signal of the pixel units; and at least one processor and at least one memory functioning as: a control unit configured to control the light emission unit, the capacitance varying unit, and the amplification unit. The control unit performs first control such that, in light modulation in which preliminary light emission of the light emission unit is performed to perform photometry, the plurality of gains are decided in accordance with a gain based on electrostatic capacitance set by the capacitance varying unit and a gain set in the amplification unit, the gains are changed for each region in which the pixel signal is read, and an image signal multiplied by the gains is output. The control unit performs second control such that an image signal multiplied by gains decided in accordance with the gain based on the electrostatic capacitance set by the capacitance varying unit and the gain set in the amplification unit is output when display or recording of the image signal output by the image sensor is performed.

Further features of the present invention will become apparent from the following description of exemplary embodiments with reference to the attached drawings.

BRIEF DESCRIPTION OF THE DRAWINGS

FIGS. 10A to 10C are explanatory diagrams illustrating reading methods when low sensitivity is set according to the first embodiment.

FIGS. 13A to 13C are timing charts illustrating a reading operation of 1H at the time of high sensitivity setting according to the first embodiment.

DESCRIPTION OF THE EMBODIMENTS

Hereinafter, preferred embodiments of the invention will be described in detail with reference to the appended drawings. In each embodiment, an imaging device in which a second scheme, that is, a scheme of performing photometry using an image sensor, is adopted will be exemplified. The imaging device can perform preliminary light emission in a light emission unit and decide an amount of emitted light at the time of imaging.

First Embodiment

Figure 1:
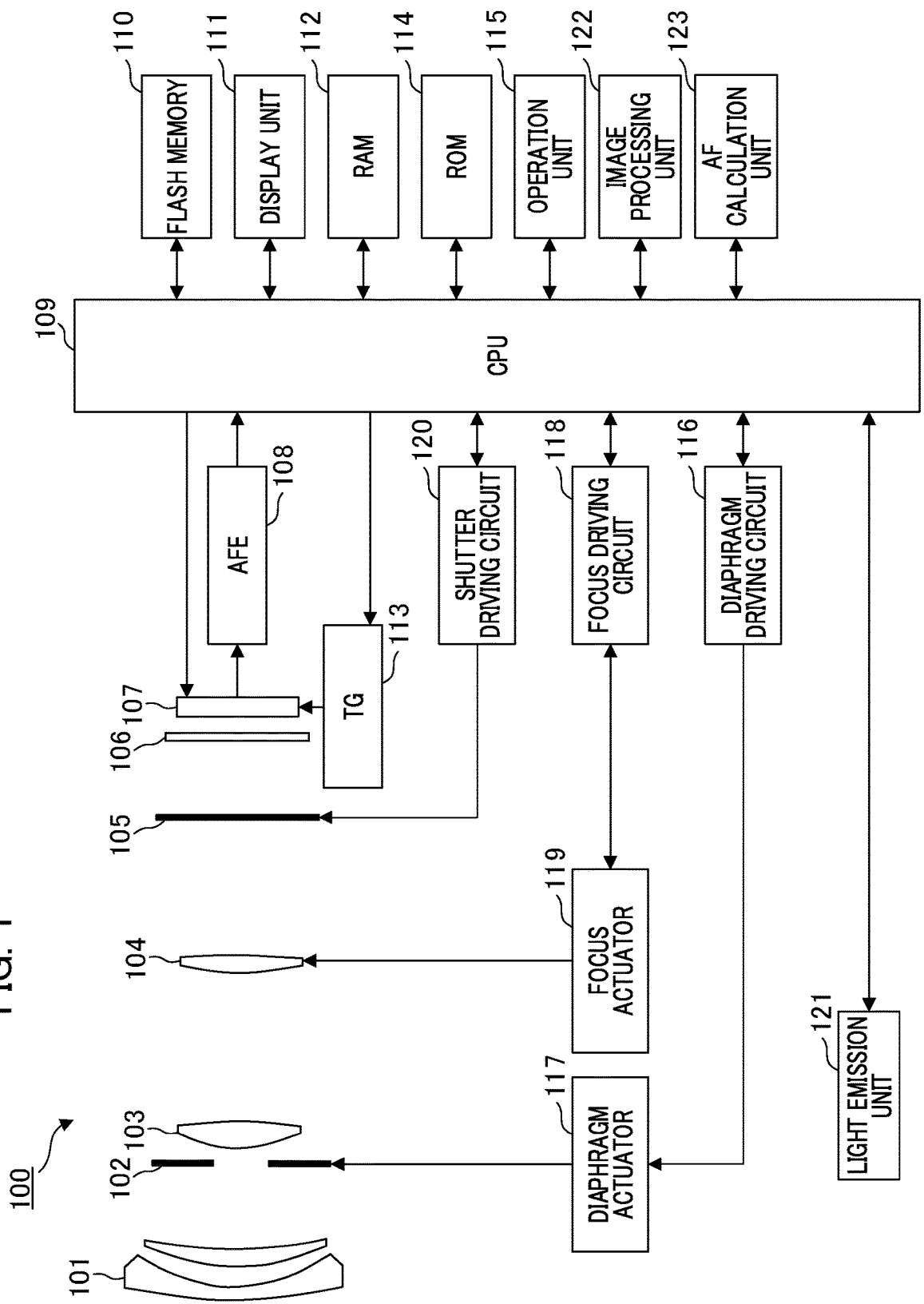
FIG. 1 is a diagram illustrating an overall configuration of an imaging device according to an embodiment of the invention.

FIG. 1 is a diagram illustrating an overall configuration of an imaging device 100 according to an embodiment of the invention. Hereinafter, a subject side is defined as a front side. Positional relations between units will be described. A first lens group 101 is a lens group disposed on the front side of an imaging optical system and is held to advance and retreat in an optical axis direction in a lens barrel. A diaphragm 102 is an optical member that performs light quantity adjustment at the time of photographing by adjusting an opening diameter and is located between the first lens group 101 and a second lens group 103. The second lens group 103 is integrated with the diaphragm 102 to advance and retreat in the optical axis direction. The second lens group 103 is a lens group that has a magnification changing action (zoom function) in cooperation with an advancing or retreating operation of the first lens group 101. A third lens group 104 is a lens group that performs focus adjustment through advancing or retreating in the optical axis direction and is located behind the second lens group 103. In the embodiment, an example of an imaging optical system including the first to third lens groups will be described. The number of lens groups is not limited and each lens group may have one lens.

The focal plane shutter 105 adjusts exposure time at the time of photographing of a still image. The invention is not limited to the focal plane shutter 105 and exposure time may be adjusted with a control pulse using an electronic shutter function that the image sensor 107 has. For example, in electronic front curtain control, rear curtain travel of the focal plane shutter 105 is performed after front curtain travel by reset scanning.

An optical low-pass filter 106 is an optical element that reduces false color or moiré of a captured image. The image sensor 107 is used to photograph a still image and a moving image and converts an optical image formed by an imaging optical system into an electric signal. The image sensor 107 according to the embodiment can variably set the resolution of a captured image and can perform signal reading at a low resolution and signal reading at a high resolution. In the signal reading at a low resolution, the image sensor 107 performs pixel decimation driving for reading charges of only some pixels or pixel addition driving for reducing the number of pixels by adding signal charges indicating pixels. In this case, since a time necessary for signal reading is short, a reading timing of a subsequent image can be advanced, that is, a frame rate can be raised. On the other hand, in the signal reading at a high resolution, reading of signals of all the pixels of the image sensor 107 is driven. In the image sensor 107 according to the embodiment, a complementary metal-oxide semiconductor (CMOS) image sensor with a Bayer array is used.

An analog front end (AFE) 108 performs gain adjustment on an analog image signal output from the image sensor 107 or converts the analog image signal into a digital signal corresponding to predetermined quantized bits. Image data output by the AFE 108 is transmitted to a central processing unit (CPU) 109 to be processed. A timing generator (TG) 113 generates a driving signal in accordance with a control instruction from the CPU 109, outputs the driving signal to the image sensor 107, and controls a driving timing of the image sensor 107. In the embodiment, the AFE 108 and the TG 113 related to the image sensor 107 are constituent units different from the image sensor 107, but the invention is not limited thereto and the image sensor 107 may contain the AFE and the TG.

The CPU 109 generally controls the imaging device 100. The CPU 109 controls a focus driving circuit 118 and a diaphragm driving circuit 116. For example, the CPU 109 drives and controls a focus actuator 119 via the focus driving circuit 118 based on a focus detection result (detection information) of an autofocus (AF) calculation unit 123. Thus, the third lens group 104 is advanced or retreated in the optical axis direction, and thus a focus adjustment operation is realized. The CPU 109 drives and controls the diaphragm actuator 117 via the diaphragm driving circuit 116 to control an opening diameter of the diaphragm 102.

A flash memory 110 is connected to the CPU 109 and records still image data and moving image data after photographing. The flash memory 110 is an example of a memory device that is detachably mounted on the imaging device 100. As another recording medium, a nonvolatile memory on which data can be written, a hard disk, or the like may be used or a recording medium may be embedded in a case.

A display unit 111 displays a still image or a moving image (live-view image) photographed in accordance with a control instruction from the CPU 109, a menu, and the like. The display unit 111 includes a thin film transistor (TFT) liquid crystal display provided on the rear surface of a body unit of the imaging device 100 or a display device of a finder.

A random access memory (RAM) 112 stores image data on which the AFE 108 performs analog/digital conversion or data processed by an image processing unit 122 to be described below. The RAM 112 functions as an image data storage unit that stores image data processed by the image processing unit 122 and has a function of a work memory of the CPU 109. In the embodiment, an example in which the RAM 112 that has a plurality of functions is mounted will be described. Another memory can be used as long as the memory is a memory with an access speed of a sufficient level. A read-only memory (ROM) 114 is a memory device such as a flash ROM that stores a program which is interpreted and executed by the CPU 109.

An operation unit 115 includes switches that are operated through a shutter switch button and a moving image photographing switch button or an operation device such as a touch panel provided on a display screen. The operation unit 115 outputs a photographing instruction from a photographer or an instruction signal of a setting operation such as an imaging condition to the CPU 109.

An image processing unit 122 acquires a signal acquired from the AFE 108 and performs a process of correcting or compressing an image mainly captured by the image sensor 107. Data processed by the image processing unit 122 is output to the CPU 109. An AF calculation unit 123 performs focus detection calculation based on a signal acquired from the AFE 108 and outputs focus detection information to the CPU 109.

A light emission unit 121 emits light in accordance with a control instruction from the CPU 109 at the time of stroboscopic photographing. A light source of the light emission unit 121 is a xenon lamp, a light-emitting diode (LED), or the like. The light emission unit 121 is a light emission unit of a stroboscopic unit fixed to the body unit of the imaging device 100 or a light emission unit of an external stroboscopic device mounted on and connected to the body unit.

Figure 2:
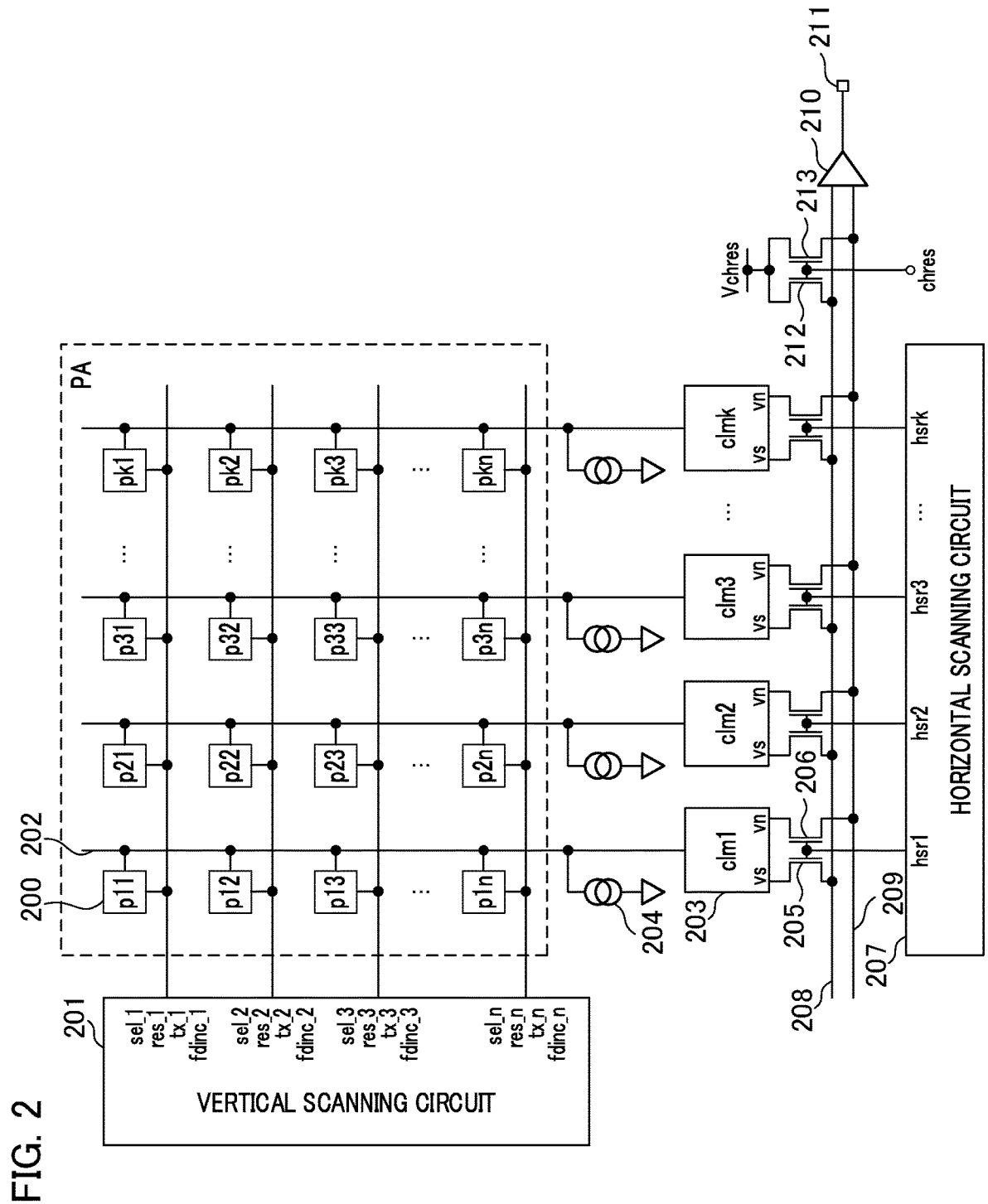
FIG. 2 is a schematic diagram illustrating an overall configuration of an image sensor according to the embodiment of the invention.

FIG. 2 is a schematic diagram illustrating an overall configuration of the image sensor 107. In a pixel region PA, as indicated by p11 to pkn, many pixel units 200 are disposed in a matrix form. A configuration of one pixel unit 200 will be described below with reference to FIG. 3.

A vertical scanning circuit 201 supplies a driving signal to each of the pixel units 200. The details of the driving signal will be described later. Each output (vout) of the pixel unit 200 is output to a column common reading circuit 203 via a vertical output line 202 at each column. A configuration of the column common reading circuit 203 will be described below with reference to FIG. 4. The vertical output line 202 is provided at each column of the pixel region PA and each current source 204 is connected.

Horizontal transfer switches 205 and 206 are connected to output (vs, vn) terminals of the column common reading circuit 203, respectively. A horizontal scanning circuit 207 controls the horizontal transfer switches 205 and 206. That is, the horizontal transfer switches 205 and 206 are controlled in accordance with an output signal hsr* (where * indicates any column number) of the horizontal scanning circuit 207. The horizontal scanning circuit 207 sets a level of the signal hsr* to a high level to transfer the outputs (vs, vn) to horizontal output lines 208 and 209, respectively. The horizontal output lines 208 and 209 are connected to input terminals of a differential amplifier 210. The differential amplifier 210 calculates a difference between an S signal and an N signal and simultaneously multiplies the difference by a predetermined gain, as will be described below, and outputs a final image signal to an output terminal 211.

By setting a level of a signal chres to the high level, horizontal output line reset switches 212 and 213 enter an ON state, and thus the horizontal output lines 208 and 209 are reset to a reset voltage V chres.

Figure 3:
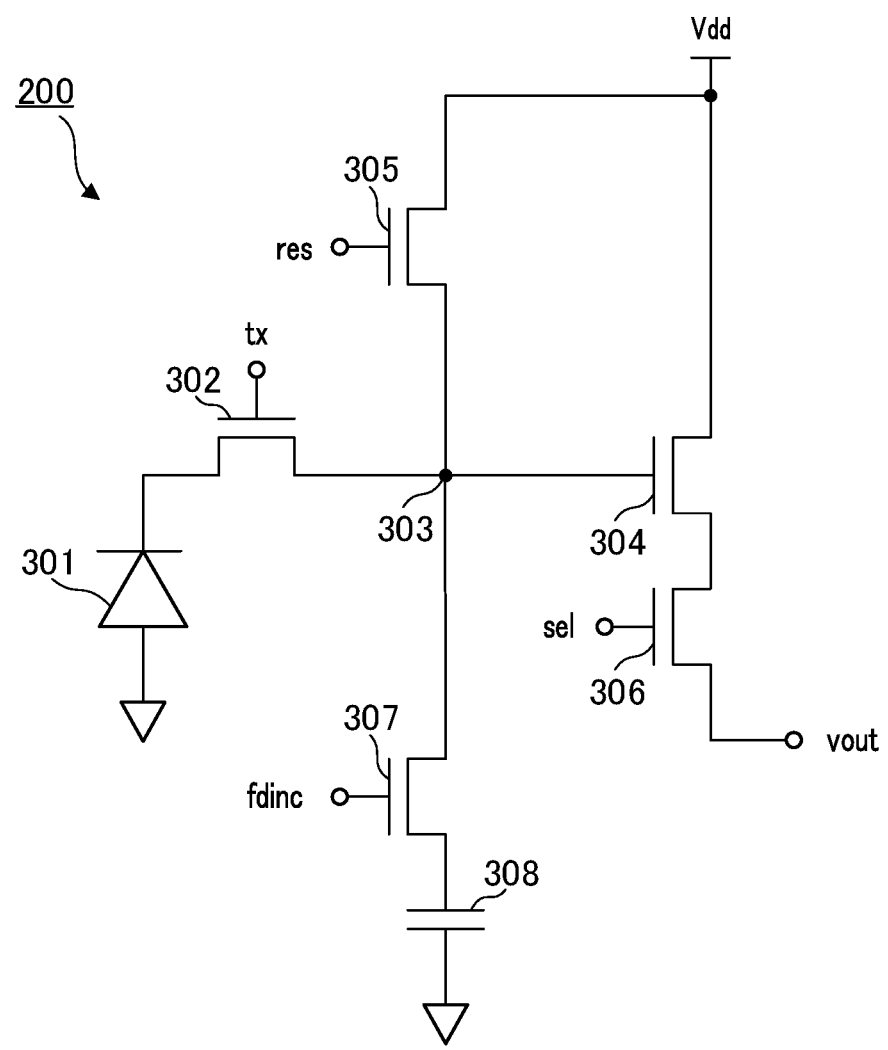
FIG. 3 is a diagram illustrating a circuit configuration of one pixel of the image sensor according to the embodiment of the invention.

A configuration of the pixel unit 200 will be described with reference to FIG. 3. A photodiode (hereinafter abbreviated as PD) 301 photoelectrically converts incident light and stores charges in accordance with an amount of incident light. When a level of a signal tx is the high level, a transfer switch 302 transfers the charges stored in the PD 301 to a floating diffusion unit 303. Hereinafter, the floating diffusion is referred to as FD. The FD unit 303 is connected to the gate of a transistor included in an FD amplifier 304. The FD amplifier 304 converts the amount of charges transferred from the PD 301 into a voltage value.

An FD reset switch 305 is a switch element that resets the FD unit 303 and resets the FD unit 303 when the level of a signal res is the high level. When the levels of the signals tx and res are simultaneously set to the high level, both the transfer switch 302 and the FD reset switch 305 are turned on, and thus the FD 301 is reset via the FD unit 303.

An FDinc switch 307 connects an additional capacitor 308 to the FD unit 303 when a level of a signal fdinc is the high level. When the level of the signal fdinc is a low level, the FDinc switch 307 is turned off, and the additional capacitor 308 and the FD unit 303 enter a non-connection state. Thus, capacitance generated in the FD unit 303 varies. In other words, the FDinc switch 307 and the additional capacitor 308 function as a capacitance varying unit that varies a capacitance value of an input node. By turning the FDinc switch 307 on and off, a conversion ratio of an output voltage of the FD amplifier 304 to the charges transferred to the FD unit 303, that is, a gain (hereinafter referred to as an FD gain), can be switched. In a connection state in which the additional capacitor 308 is connected to the FD unit 303, an electrostatic capacitance value increases and the gain is less than in the non-connection state. In contrast, when the additional capacitor 308 and the FD unit 303 enter the non-connection state, the electrostatic capacitance value decreases and the gain is greater than in the connection state. In this way, the imaging device according to the embodiment can vary the amount of charges retained in the FD unit 303 in accordance with the signal fdinc to switch the gain of the pixel unit 200.

A pixel selection switch 306 outputs a pixel signal converted into the voltage by the FD amplifier 304 when a level of a signal sel is the high level (see vout). An output of the pixel unit 200 is input to the column common reading circuit 203 via the vertical output line 202 at each column.

The driving signals tx, res, sel, and fdinc are supplied from the vertical scanning circuit 201 in FIG. 2 to the pixel unit 200. The driving signals are denoted by tx_i, res_i, sel_i, and fdinc_i to which a natural number variable i (where i=1, 2, . . . , n) indicating a number corresponding to a row is added.

Figure 4:
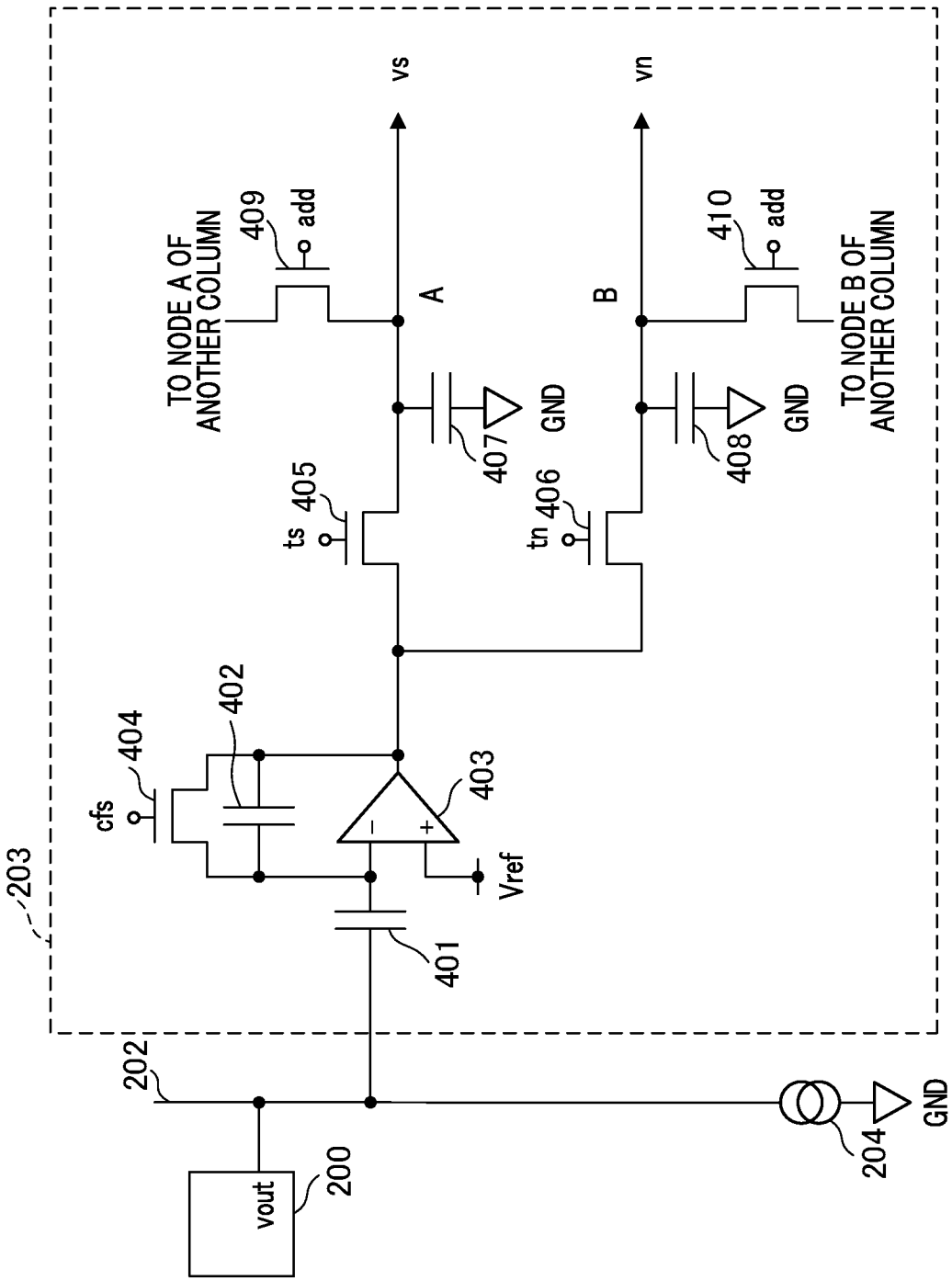
FIG. 4 is a diagram illustrating a configuration of a reading circuit in each column of the image sensor according to the embodiment of the invention.

A configuration of the column common reading circuit 203 will be described with reference to FIG. 4. The output (vout) of the pixel units 200 equivalent to one row is input to the column common reading circuit 203 via the vertical output line 202 connected to the output terminals. The vertical output line 202 provided for each column is grounded via the current source 204. The current source 204 and the FD amplifier 304 of the pixel units 200 connected to the vertical output line 202 form a source follower circuit.

In the column common reading circuit 203, a clamp capacitor 401 has electrostatic capacitance C1 and a feedback capacitor 402 has electrostatic capacitance C2. The output (vout) of the pixel units 200 is input to an inverted input terminal of an operational amplifier 403 via the clamp capacitor 401. A reference voltage Vref is supplied to a non-inverted input terminal of the operational amplifier 403. A switch 404 is connected in parallel to the feedback capacitor 402 connected to an inverted input terminal and an output terminal of the operational amplifier 403. The switch 404 is a switch element that short-circuits both ends of the feedback capacitor 402 and is controlled in accordance with a signal cfs. Gain setting can be changed by controlling ON and OFF of the switch 404.

An S signal transfer switch 405 is a switch element that transfers a pixel signal (referred to as an S signal) read from the pixel unit 200 to an S signal retention capacitor 407. By setting a level of a signal ts to the high level, a pixel signal S amplified by the operational amplifier 403 is retained in the S signal retention capacitor 407 via the S signal transfer switch 405.

An N signal transfer switch 406 is a switch element that transfers a noise signal (referred to as an N signal) read from the pixel unit 200 to an N signal retention capacitor 408. By setting a level of a signal tn to a high level, the noise signal N amplified by the operational amplifier 403 is retained in the N signal retention capacitor 408 via the N signal transfer switch 406.

The S signal retention capacitor 407 and the N signal retention capacitor 408 are connected to terminals corresponding to the outputs vs and vn of the column common reading circuit 203, respectively. An S signal addition switch 409 and an N signal addition switch 410 are switch elements that add and average the S signals and the N signals of a corresponding column, respectively. One end of the S signal addition switch 409 is connected to a node A in the drawing and the other end thereof is connected to the node A corresponding to another column which is an addition target. One end of the N signal addition switch 410 is connected to a node B in the drawing and the other end thereof is connected to the node B corresponding to another column which is an addition target. The S signal addition switch 409 and the N signal addition switch 410 are controlled in accordance with a signal add. That is, by setting a level of the signal add to the high level, the S signal retention capacitors 407 of an addition target column are connected and the N signal retention capacitors 408 of an addition target column are connected. After the level of the signal add is set to the high level and then is set to the low level, the signals of the addition target column are added and averaged. A combination of addition columns will be described later. In the column common reading circuit 203, the driving signals such as cfs, ts, tn, and add are supplied from the TG 113 under the control of the CPU 109.

Figure 7:
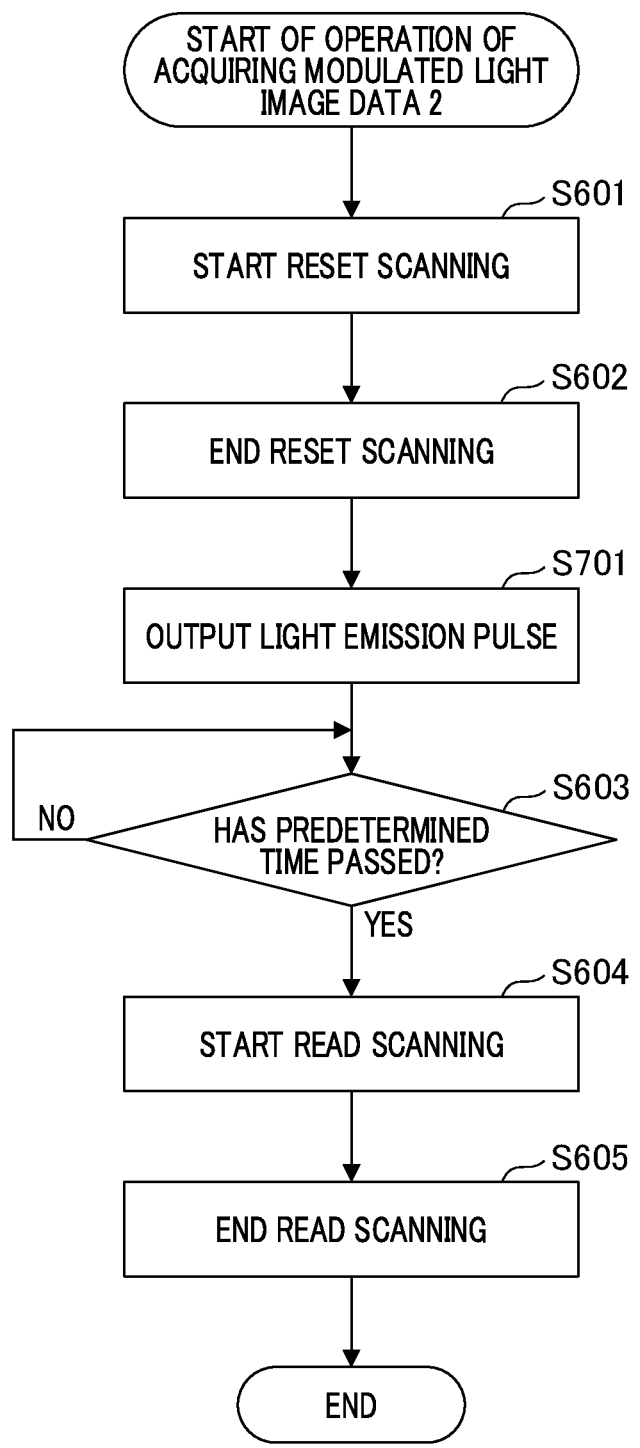
FIG. 7 is a flowchart illustrating an operation of acquiring modulated light image data 2 according to the first embodiment.
Figure 8:
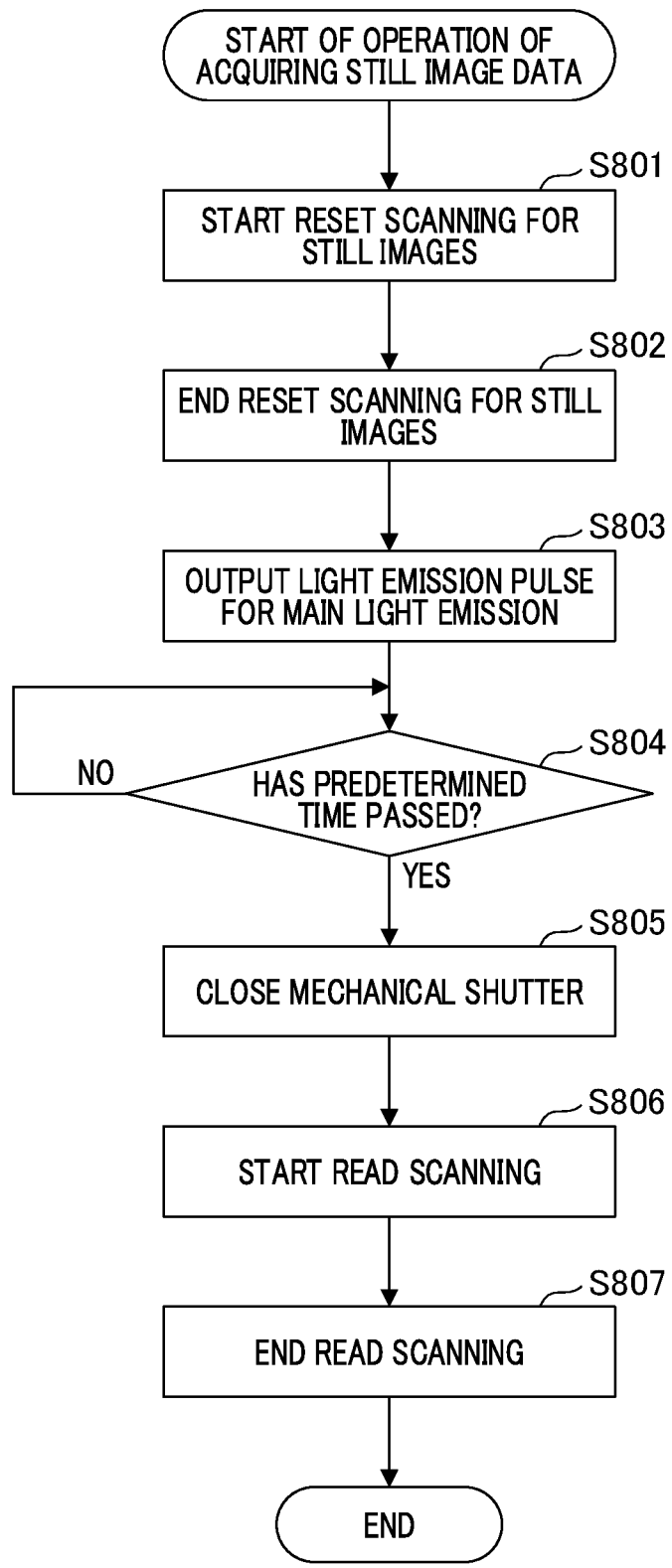
FIG. 8 is a flowchart illustrating an acquisition operation for still image data according to the first embodiment.
Figure 9:
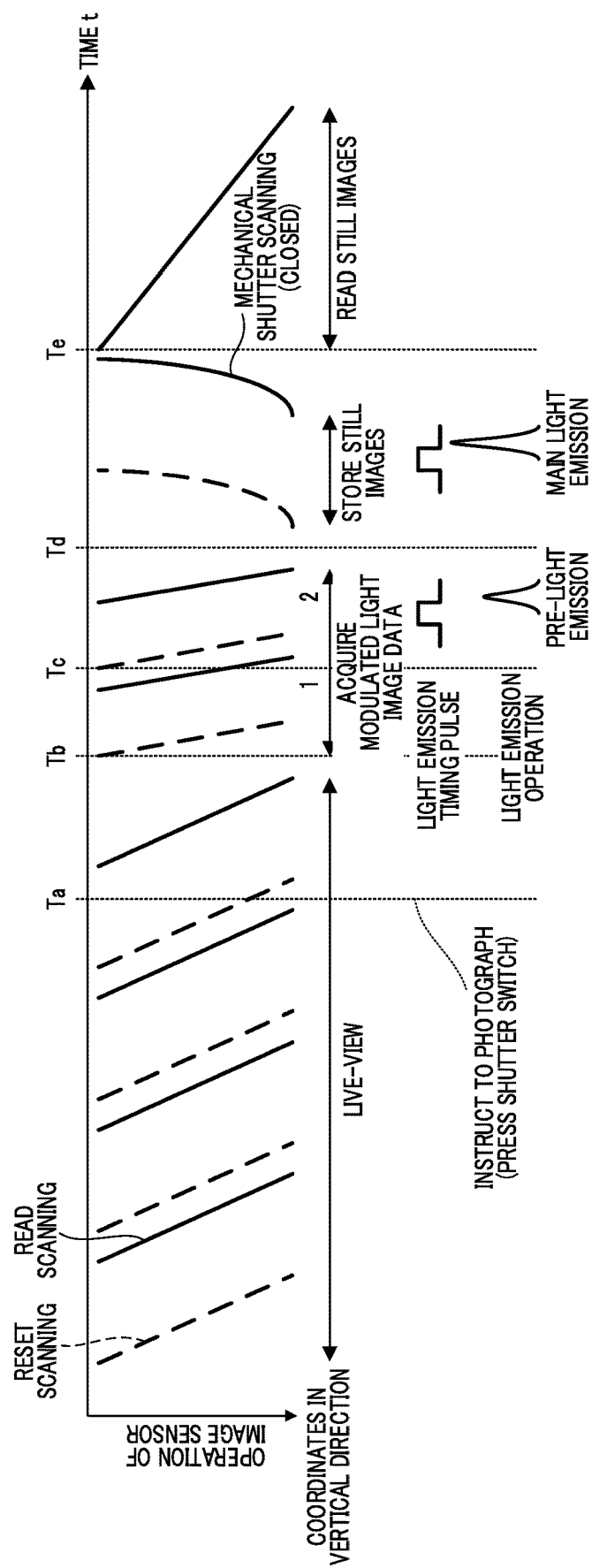
FIG. 9 is a sequence diagram illustrating an imaging operation according to the first embodiment.

Next, an imaging operation of the imaging device 100 will be described with reference to the flowcharts of FIGS. 5 to 8 and FIG. 9. FIG. 9 is a diagram illustrating a sequence of the imaging operation. The horizontal axis is a time axis and the vertical axis represents coordinates of the image sensor in the vertical direction. In FIG. 9, reset scanning of the image sensor and read scanning of a signal are indicated by slanted lines. The reset scanning indicated by dotted lines and the read scanning indicated by solid lines are distinguished from each other.

Figure 5:
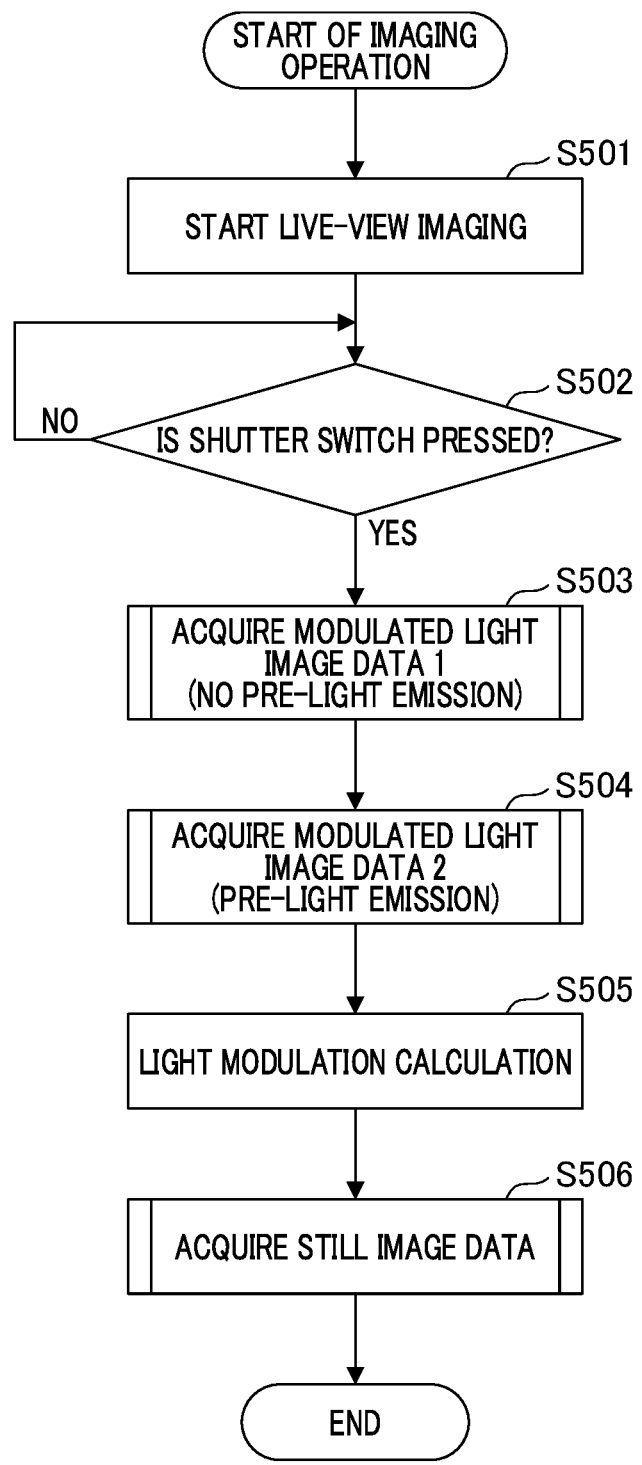
FIG. 5 is a flowchart illustrating an imaging operation according to a first embodiment.

First, in S501 of FIG. 5, the CPU 109 starts live-view (hereinafter referred to as LV) photographing. In the LV photographing, as will be described below, images based on image data continuously acquired through an LV photographing operation of the image sensor 107 are sequentially displayed on the display unit 111. Thereafter, in S502, the CPU 109 determines whether a photographer presses a shutter switch (SW) included in the operation unit 115. Until the shutter switch is operated to be turned on, the LV photographing continues. When the photographer presses the shutter switch and performs a photographing instruction (time Ta in FIG. 9), the process proceeds to S503.

In S503, the CPU 109 ends the LV photographing operation of the image sensor 107 and acquires first modulated light image data 1. A process of acquiring modulated light image data 1 starts at time Tb of FIG. 9. To acquire modulated light image data 1 in a short time, addition averaging is performed for every 3 pixels of the same color in the horizontal direction and a process of decimating and reading the signals of 9 rows at a period of each row in the vertical direction is performed. In the process of acquiring modulated light image data 1, the light emission unit 121 does not emit light. The details of the process of S503 will be described later with reference to FIG. 6.

In S504, the CPU 109 acquires second modulated light image data 2. At time Tc of FIG. 9, a process of acquiring modulated light image data 2 starts. For modulated light image data 2, addition averaging is performed for every 3 pixels of the same color in the horizontal direction and a process of decimating and reading the signals of 9 rows at a period of each row in the vertical direction is performed as in modulated light image data 1. In the process of acquiring modulated light image data 2, the CPU 109 performs pre-light emission (preliminary light emission) with a predetermined amount of light. Light emission control of the light emission unit 121 is performed at a timing of a predetermined light emission pulse.

As illustrated in FIG. 9, read scanning for acquiring modulated light image data 1 and reset scanning for acquiring modulated light image data 2 are performed in parallel. Actually, parts of the operation of acquiring modulated light image data 1 and an operation of acquiring modulated light image data 2 may overlap. The details of the process of S504 will be described later with reference to FIG. 7.

In S505 of FIG. 5, the CPU 109 performs light modulation calculation to calculate an amount of light emitted from the light emission unit 121 (hereinafter referred to as an amount of main emitted light) in still image photographing and decides the calculated amount of emitted light as an amount of main emitted light. In the light modulation calculation of S505, modulated light image data 1 is compared to modulated light image data 2 and a process of extracting a reflected light component of the pre-light emission is performed. The amount of main emitted light is calculated based on the extracted reflected light component of the pre-light emission. In S506, the CPU 109 controls the main light emission of the light emission unit 121 and acquires still image data. At time Td of FIG. 9, an operation of storing the still images starts. The main light emission of the light emission unit 121 is controlled at a timing of a predetermined light emission pulse. Thereafter, the imaging operation ends. The details of the process of S506 will be described later with reference to FIG. 8.

Figure 6:
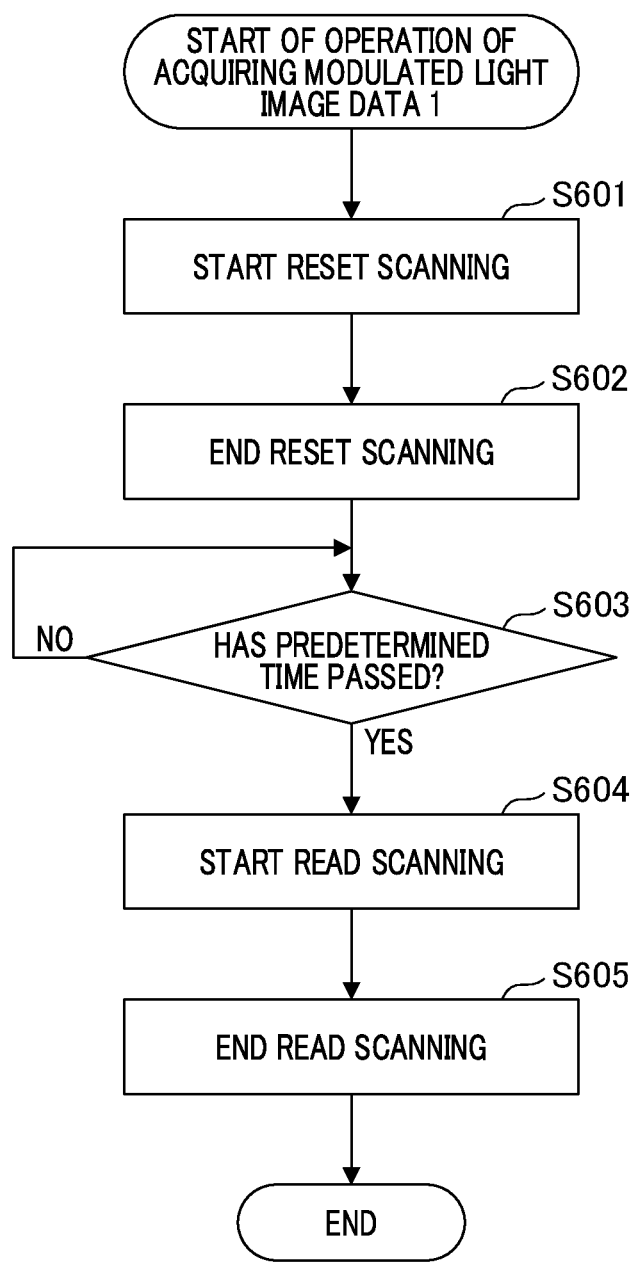
FIG. 6 is a flowchart illustrating an operation of acquiring modulated light image data 1 according to the first embodiment.

The process of acquiring modulated light image data 1 in S503 of FIG. 5 will be described with reference to FIG. 6. First, the CPU 109 starts the reset scanning and sequentially resets each pixel row of the image sensor 107 in S601. Each pixel unit is reset by setting both the levels of the signal res and the signal tx to the high level via the vertical scanning circuit 201 in FIGS. 2 and 3.

After the reset scanning of the final pixel row ends in S602, the process proceeds to S603. In S603, the CPU 109 waits until a predetermined storage time passes. When the CPU 109 determines in S603 that the predetermined storage time has passed, the process proceeds to S604. In S604, the CPU 109 starts the read scanning of the image sensor 107. Then, when the read scanning ends in S605, the process of acquiring modulated light image data 1 is completed. When the predetermined storage time is short, the storage time of the first pixel row can pass before the reset scanning of the final pixel row ends. In this case, even before the reset scanning of the final pixel row ends, the read scanning may start in sequence from the pixel row in which the predetermined storage time has passed.

Next, the process of acquiring modulated light image data 2 in S504 of FIG. 5 will be described with reference to FIG. 7. The process of acquiring modulated light image data 2 is different from the process of acquiring modulated light image data 1 in that the pre-light emission is performed. Since each process from S601 to S605 has been described, a process of S701 which is the different point will be described.

The process proceeds to S701 after the reset scanning in S602 ends. The CPU 109 outputs a light emission pulse for the pre-light emission to the light emission unit 121 and causes the light emission unit 121 to emit light. After S701, the process proceeds to S603 and the read scanning in S604 starts after the pre-light emission.

In the embodiment, an example in which a light emission pulse for the pre-light emission is output after the reset scanning ends will be described. However, when it takes a time from output of the light emission pulse to actual light emission of the light emission unit 121, the light emission pulse may be output before completion of the reset scanning, and the actual pre-light emission may be performed immediately after the reset scanning is completed in anticipation of the time lag may be anticipated. At that time, the light emission pulse may be output at a time point at which a predetermined time has passed from the start of the reset scanning of S601.

As in the process of acquiring modulated light image data 1, the read scanning may start in sequence from a pixel in which the predetermined storage time has passed even before the reset scanning of all the pixels ends. In this case, before start of the reset scanning of the pixels first subjected to the reset scanning, it is desirable to continue performing the pre-light emission until the read scanning of the pixel signal finally subjected to the reset scanning is completed.

The process of acquiring the still image data in S506 of FIG. 5 will be described with reference to FIG. 8. First, the CPU 109 starts the reset scanning for still images in S801 (time Td in FIG. 9). Thus, the charges of the pixels of the image sensor 107 are cleared in sequence for each pixel row. In FIG. 9, the reset scanning for still images is indicated by a dotted curve line. This curve line has a shape similar to a curve line indicated by a solid line at the time of mechanical shutter (focal plane shutter) scanning for shielding the image sensor 107 from light. The invention is not limited to this example and charges of all the pixel rows may be simultaneously cleared in an embodiment. Here, in this case, since a time from the time point at which the charges are cleared to the time point at which the image sensor is shielded from light by the focal plane shutter differs in accordance with the pixel row, an operation in which an exposure amount differs in accordance with the pixel row is performed.

In S802, the reset scanning for still images ends. Thereafter, in S803, the CPU 109 outputs a light emission pulse for main light emission for performing the main light emission for still image photographing and performs the main light emission of the light emission unit 121 at a predetermined timing.

Subsequently, in S804, the CPU 109 determines whether a storage time equivalent to a set shutter speed has passed. When it is determined that the storage time has passed, the process proceeds to S805. When it is determined that the storage time has not passed, the determination process of S804 is repeated. In S805, the CPU 109 travels the focal plane shutter 105 via the shutter driving circuit 120 (rear curtain travel) and causes the image sensor 107 to be shielded from light. The focal plane shutter 105 travels like a curve line indicated by a solid line in FIG. 9 and the shutter is closed in S805. Thereafter, in S806, the CPU 109 starts the read scanning of the image sensor 107 (time Te in FIG. 9). When the read scanning ends in S807, the process of acquiring the still image data is completed.

Next, control performed in the case of low sensitivity setting in which imaging sensitivity (ISO sensitivity) is less than a threshold will be described with reference to FIGS. 10A to 10C and 11A to 11C. First, a method of reading pixel signals in the image sensor 107 in accordance with a mode in which the imaging sensitivity is set to low ISO sensitivity will be described with reference to FIGS. 10A to 10C. In FIGS. 10B and 10C, pixels displayed with gray indicate pixels which are decimated and are thus not read.

FIG. 10A is an explanatory diagram illustrating a method of reading pixel signals in the image sensor 107 when low ISO sensitivity is set in an operation mode of still image photographing. The image sensor 107 is a CMOS image sensor with a Bayer array and performs a process of independently reading all the pixels of the image sensor 107 in the still image photographing. When the pixel signals are read, gains in the FD unit 303, the operational amplifier 403, the differential amplifier 210, and the like are set. In all the pixels, the FDinc switches 307 are turned on to read the pixel signals at a gain equivalent to ISO100.

FIG. 10B is an explanatory diagram illustrating a method of reading pixel signals in the image sensor 107 when low ISO sensitivity is set in an operation mode of LV photographing. In this case, when addition or decimation reading of the pixel signals is performed to ensure a frame rate, the number of read pixels is limited. Here, it is assumed that an addition averaging process is performed for every 3 pixels of the same color in the horizontal direction and decimation reading is performed at a period of 1 row from 3 rows in the vertical direction.

When the pixel signals are read, gains in the FD unit 303, the operational amplifier 403, the differential amplifier 210, and the like are set. In the read pixels, the FDinc switches 307 in the pixels from which the decimation signals are read at the period of 1 row from 3 rows in the vertical direction are turned on to read the pixel signals at a gain equivalent to ISO100.

FIG. 10C is an explanatory diagram illustrating a method of reading pixel signals in the image sensor 107 when low ISO sensitivity is set in an operation mode when modulated light image data 1 and modulated light image data 2 are acquired. In the light modulation control, it is desirable to read the signals of the image sensor 107 at a high speed to shorten a release time lag as much as possible. In the embodiment, the number of read pixels is further limited than in the LV photographing. For example, an addition averaging process is performed for every 3 pixels of the same color in the horizontal direction as in the LV photographing and a decimation reading is performed at a period of 1 row from 9 rows in the vertical direction. Thus, high speed is achieved. When the pixel signals are read, gains in the FD unit 303, the operational amplifier 403, the differential amplifier 210, and the like are set. The FDinc switches 307 in the pixels from which decimation signals are read at the period of 1 row from 9 rows in the vertical direction are turned off and a process of alternately reading the pixel signals at gains equivalent to ISO100 and equivalent to ISO1600 for every 2 rows of the read rows is performed. That is, when the pixel signals are read once, signals multiplied by two different kinds of gains are read.

Figure 11A:
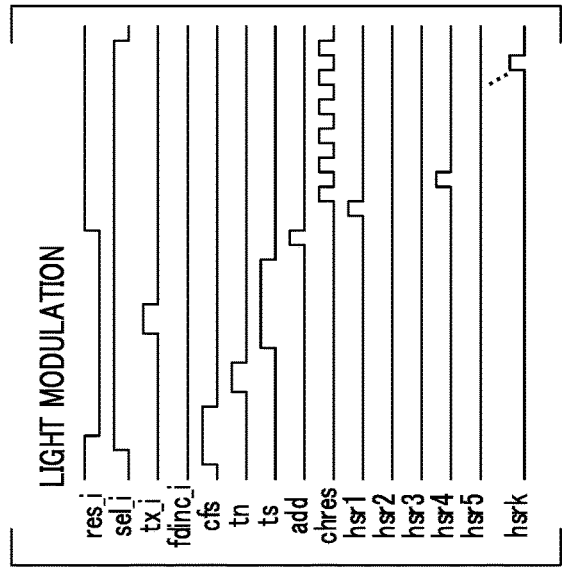
FIGS. 11A to 11C are timing charts illustrating a reading operation of 1H at the time of low sensitivity setting according to the first embodiment.
Figure 11B:
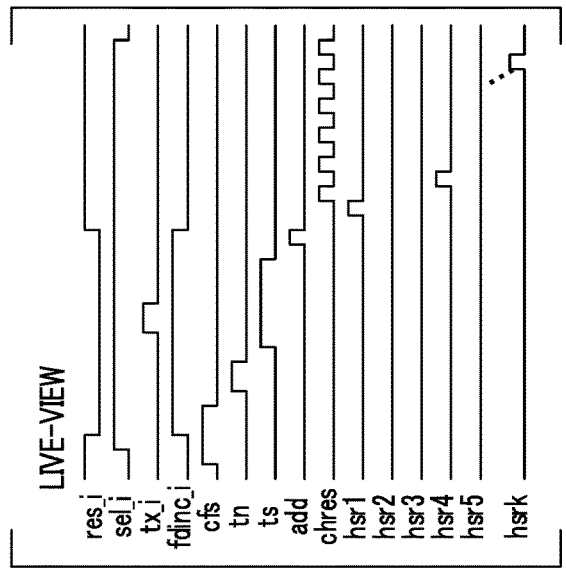
Figure 11C:
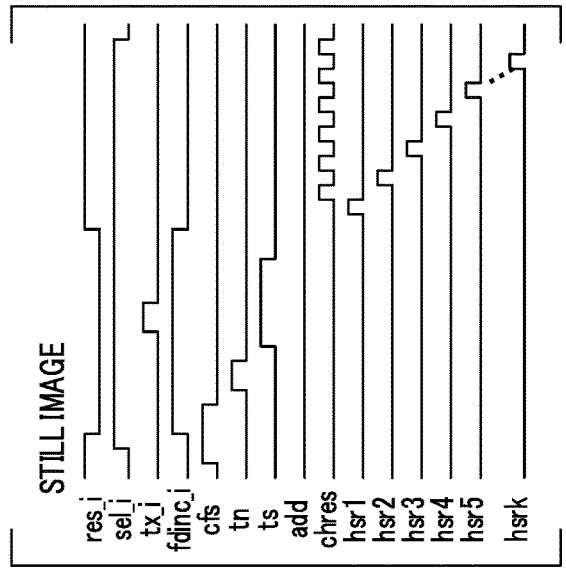

A reading operation in the image sensor 107 when the imaging sensitivity is set to low ISO sensitivity will be described with reference to FIGS. 11A to 11C. FIGS. 11A to 11C are timing charts illustrating signals res_i, sel_i, tx_i, fdinc_i, cfs, tn, ts, add, chres, and hsr1 to hsrk of an i-th row.

FIG. 11A illustrates a reading operation of the i-th row in the image sensor 107 when low ISO sensitivity is set at the time of acquisition of still image data. First, the CPU 109 sets the level of the signal cfs (see FIG. 4) to the high level via the TG 113 to turn on the switches 404 and short-circuits both ends of the feedback capacitors 402. Subsequently, the CPU 109 sets the level of the signal sel_i to the high level via the TG 113 to turn on the pixel selection switches 306 (see FIG. 3) of the pixels in the i-th row. Thereafter, the CPU 109 sets the level of the signal res_i (see FIG. 3) to the low level to turn off the FD reset switches 305 and releases the reset of the FD units 303. At this time, the CPU 109 sets the level of the signal fdinc_i to the high level via the TG 113 to turn on the FDinc switches 307 and connects the additional capacitors 308 to the FD units 303. Thereafter, the CPU 109 sets the level of the signal cfs to the low level via the TG 113 to turn off the switches 404 and clamps a voltage of the vertical output line 202 after the reset releasing of the FD units 303 to the clamp capacitors 401 (the electrostatic capacitance C1).

Subsequently, the CPU 109 sets the level of the signal tn (see FIG. 4) to the high level via the TG 113 to turn on the N signal transfer switches 406 and retains an N signal in the N signal retention capacitor 408. Subsequently, the CPU 109 sets the level of the signal tn to the low level via the TG 113 to turn off the N signal transfer switches 406. Thereafter, the CPU 109 sets the level of the signal ts to the high level to turn on the S signal transfer switches 405 and sets the level of the signal tx_i (see FIG. 3) to the high level to turn on the transfer switches 302. Through this operation, the signals stored in the PDs 301 in the i-th row selected at the current time point are output to the vertical output lines 202 via the FD amplifiers 304 and the pixel selection switches 306. The signals are retained in the S signal retention capacitors 407 via the operational amplifiers 403 and the S signal transfer switches 405.

Subsequently, the CPU 109 sets the levels of the signals tx_i and is to the low level via the TG 113 to turn off the transfer switches 302 and the S signal transfer switches 405. Thereafter, the CPU 109 sets the level of the signal res_i to the high level to turn on the FD reset switches 305 and resets the FD unit 303. Through the operation until here, an operation of storing the S signal and the N signal in the i-th row in the S signal retention capacitor 407 and the N signal retention capacitor 408 ends.

Subsequently, an operation of outputting the S signal and the N signal retained in the S signal retention capacitor 407 and the N signal retention capacitor 408 from the image sensor 107 is performed. First, the CPU 109 turns on the horizontal transfer switches 205 and 206 by setting the level of the output hsr1 (see FIG. 2) of the horizontal scanning circuit 207 to the high level. Then, the signals retained in the S signal retention capacitor 407 and the N signal retention capacitor 408 are output to the output terminal 211 via the horizontal output lines 208 and 209 and the differential amplifier 210. The CPU 109 outputs all the signals in the i-th row by sequentially setting the levels of the selected signals hsr1, hsr2, . . . and hsrk of each column of the horizontal scanning circuit 207 to the high level. While the signals in each column are read in accordance with the signals hsr1 to hsrk, the CPU 109 turns on the horizontal output line reset switches 212 and 213 by setting the level of the signal chres to the high level. Thus, the levels of the horizontal output lines 208 and 209 are reset to the reset voltage V chres.

In this way, the reading operation equivalent to one row ends. The signal reading operation of the image sensor 107 is performed by sequentially performing the operation in each reading target row.

FIG. 11B illustrates a reading operation of the image sensor 107 when low ISO sensitivity is set in the LV photographing. Hereinafter, differences from FIG. 11A will be mainly described. After the S signal is retained in the S signal retention capacitors 407 and before an operation of the horizontal scanning circuit 207 starts, the CPU 109 temporarily sets the level of the signal add (see FIG. 4) to the high level via the TG 113. Thus, the S signal addition switches 409 and the N signal addition switches 410 are turned on. Thereafter, the CPU 109 turns off the S signal addition switches 409 and the N signal addition switches 410 by returning the level of the signal add to the low level via the TG 113. Through this operation, the signals retained in the S signal retention capacitors 407 and the N signal retention capacitors 408 in each column are added and averaged with the signals in each addition target column. Thereafter, for example, in a state of hsr1, hsr4, hsr7, . . . , and the like, the horizontal scanning circuit 207 limits the number of pixels in the horizontal direction and performs the reading process by setting the selected signals to the high level at a period of 1 column from 3 columns.

FIG. 11C illustrates a reading operation of the image sensor 107 when low ISO sensitivity is set at the time of acquisition of modulated light image data 1 and modulated light image data 2. Hereinafter, differences from FIGS. 11A and 11B will be mainly described. When signals are multiplied by two different kinds of gains for each row, the CPU 109 sets the level of the signal fdinc_i to the low level via the TG 113 and turns off the FDinc switch 307 in any row. The additional capacitors 308 and the FD units 303 enter a non-connection state. Thereafter, the process of reading the pixel signals is performed at the same timing as a timing indicating the reading operation of the image sensor 107 in the LV photographing illustrated in FIG. 11B.

Next, control performed when high sensitivity setting in which the imaging sensitivity is equal to or greater than the threshold is performed will be described with reference to FIGS. 12A to 12C and 13A to 13C. A method of reading the pixel signals of the image sensor 107 in accordance with a mode in which the imaging sensitivity is set to high ISO sensitivity will be described with reference to FIGS. 12A to 12C. In FIGS. 12B and 12C, pixels displayed with gray indicate pixels which are decimated and are thus not read.

Figure 12A:
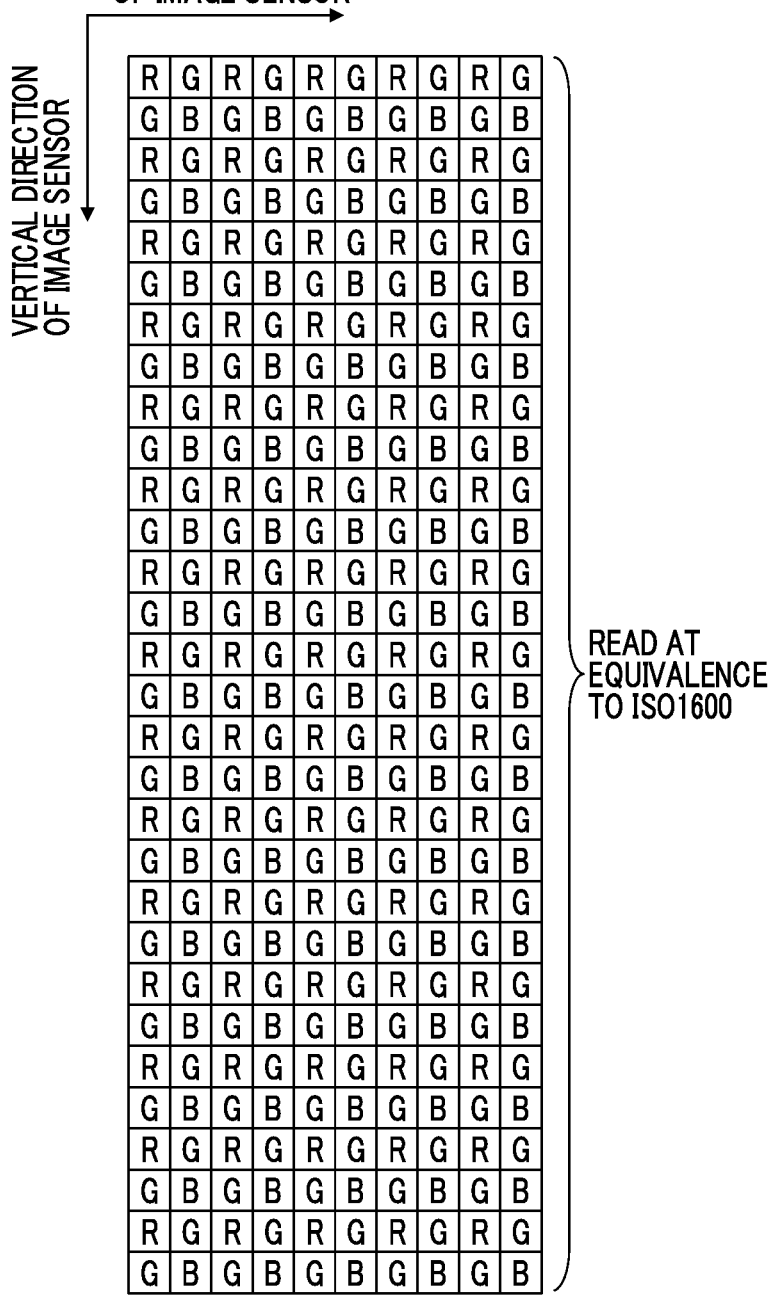
FIGS. 12A to 12C are explanatory diagrams illustrating a reading method at the time of high sensitivity setting according to the first embodiment.
Figure 12B:
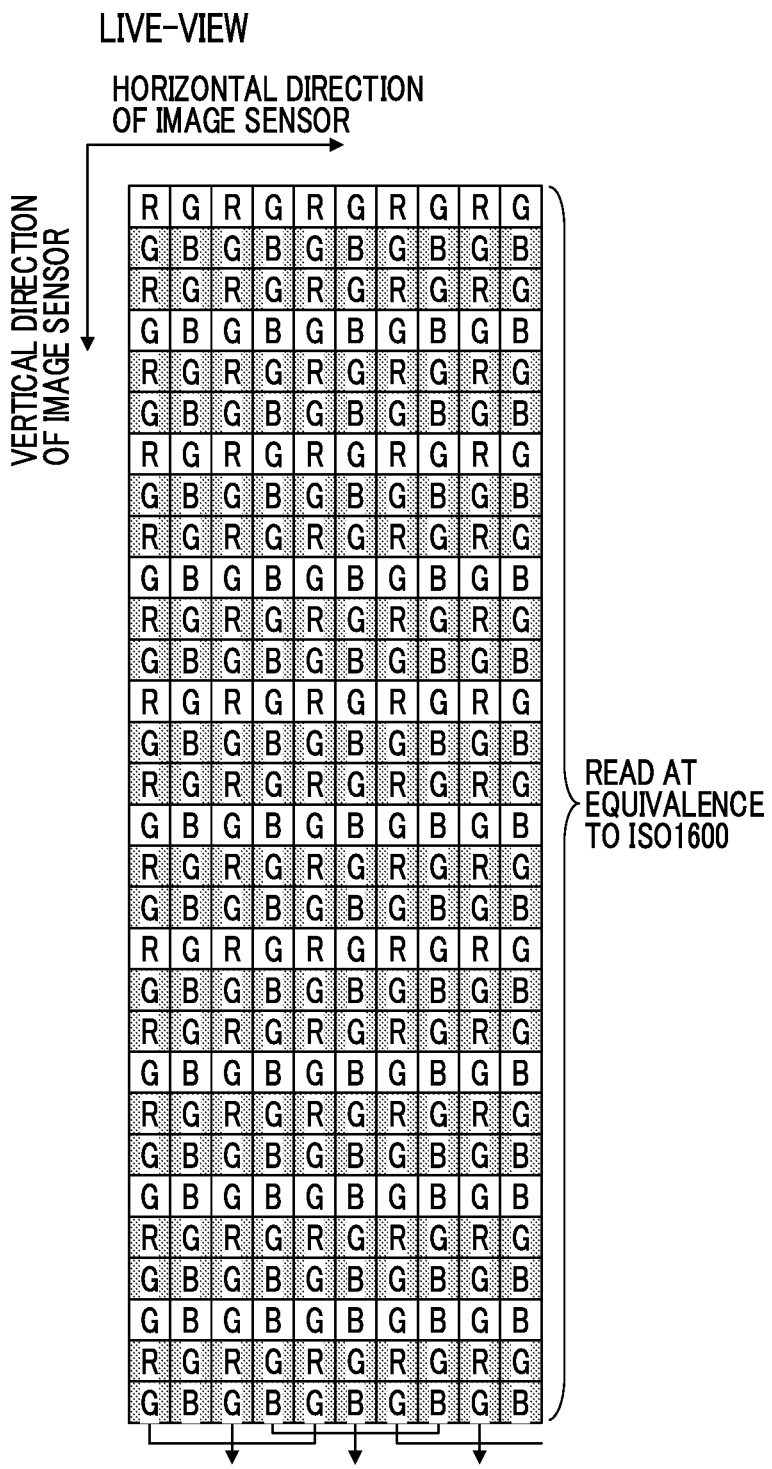
Figure 12C:
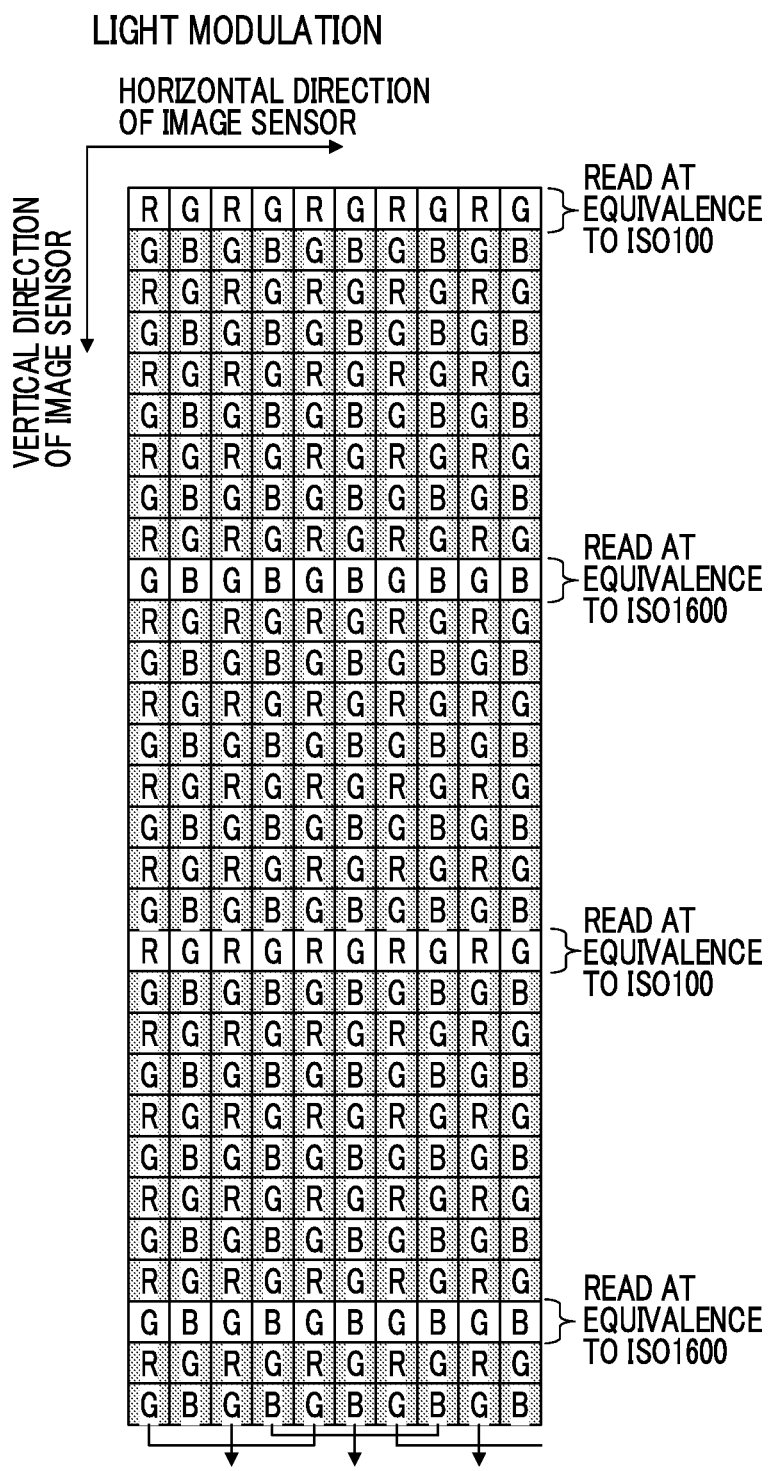

FIG. 12A is an explanatory diagram illustrating a method of reading pixel signals in the image sensor 107 when high ISO sensitivity is set in the operation mode of still image photographing. The image sensor 107 is a CMOS image sensor with the Bayer array and performs a process of independently reading all the pixels of the image sensor 107 in the still image photographing. When the pixel signals are read, gains in the FD unit 303, the operational amplifier 403, the differential amplifier 210, and the like are set. In all the pixels, the FDinc switches 307 are turned off to read the pixel signals at a gain equivalent to ISO1600.

FIG. 12B is an explanatory diagram illustrating a method of reading pixel signals in the image sensor 107 when high ISO sensitivity is set in an operation mode of the LV photographing. In this case, when addition or decimation reading of the pixel signals is performed to ensure a frame rate, the number of read pixels is limited. It is assumed that an addition averaging process is performed for every 3 pixels of the same color in the horizontal direction and the decimation reading is performed at a period of 1 row from 3 rows in the vertical direction.

When the pixel signals are read, gains in the FD unit 303, the operational amplifier 403, the differential amplifier 210, and the like are set. In the read pixels, the FDinc switches 307 in the pixels from which the decimation signals are read at the period of 1 row from 3 rows in the vertical direction are turned off to read the pixel signals at a gain equivalent to ISO1600.

FIG. 12C is an explanatory diagram illustrating a method of reading pixel signals in the image sensor 107 when high ISO sensitivity is set in an operation mode when modulated light image data 1 and modulated light image data 2 are acquired. As in FIG. 10C, an addition averaging process is performed for every 3 pixels of the same color in the horizontal direction and a decimation reading is performed at a period of 1 row from 9 rows in the vertical direction. Thus, high speed is achieved. When the pixel signals are read, gains in the FD unit 303, the operational amplifier 403, the differential amplifier 210, and the like are set. The FDinc switches 307 in the pixels from which decimation signals are read at the period of 1 row from 9 rows in the vertical direction are turned off and a process of alternately reading the pixel signals at gains equivalent to ISO100 and equivalent to ISO1600 for every 2 rows of the read rows. That is, when the pixel signals are read once, signals multiplied by two different kinds of gains are read.

Next, a reading operation of the image sensor 107 in setting of high ISO sensitivity will be described with reference to timing charts of FIGS. 13A to 13C. As in FIGS. 11A to 11C, signals of an i-th row as are read in the description.

FIG. 13A illustrates a reading operation of the i-th row in the image sensor 107 when high ISO sensitivity is set in acquisition of still image data. FIG. 13B illustrates a reading operation of the image sensor 107 when high ISO sensitivity is set in the LV photographing. In FIGS. 13A and 13B, only a signal fdinc_i which is a difference from FIGS. 11A and 11B corresponding thereto will be described.

The CPU 109 sets a level of the signal fdinc_i to the low level via the TG 113 to turn off the FDinc switch 307. Thus, the additional capacitor 308 and the FD unit 303 enter a non-connection state.

FIG. 13C illustrates a reading operation of the image sensor 107 when high ISO sensitivity is set at the time of acquisition of modulated light image data 1 and modulated light image data 2. Only gain setting in the setting of the high ISO sensitivity is different and operation timings are the same as the timings illustrated in FIG. 11C.

In the embodiment, when the pixel signals are read once from the pixel array of the modulated light image data, an image signal output multiplied by a plurality of kinds of different gains can be obtained. Thus, it is possible to expand a dynamic range of the image signal output obtained by one-time exposure and expand a dynamic range of the still image photographing or the LV photographing.

In the embodiment, the cases in which two different kinds of gains equivalent to ISO100 and ISO1600 are selected have been exemplified. The values of the selected gains and the number of kinds of gains are not limited thereto. In the embodiment, the scheme of performing the addition averaging process and the reading for every 3 pixels in the horizontal direction in the LV photographing and the acquisition of the modulated light image data has been described. The number of pixels when the addition averaging process is performed is not limited to 3 pixels and an addition averaging process performed using any number of pixels for reading may be performed. The schemes of performing the decimation reading on the pixels in the vertical direction at the period of 1 row from 3 rows in the LV photographing and performing the decimation reading on the pixels in the vertical direction at the period of 1 row from 9 rows at the time of acquisition of the modulated light image data have been described. The number of pixels subjected to decimation is not limited and the decimation reading may be performed at any number of pixels. The reading of the pixel signals in the vertical direction is not limited to the decimation reading, and the additional averaging process may be performed on the pixels in the vertical direction in the reading. The number of pixels when the addition averaging process is performed is not limited, and the addition averaging process and the reading may be performed on any number of pixels. Further, in the embodiment, the configuration in which the modulated light image data is acquired when the shutter switch (the release switch) is pressed has been described. When a light modulation switch is pressed during the LV photographing, the modulated light image data may be acquired, a calculated amount of emitted light may be decided as the amount of main emitted light, and the photographing may return to the LV photographing when the pressing of the light modulation switch is released.

Second Embodiment

Next, a second embodiment of the invention will be described. In the first embodiment, the case in which the FD gain is raised at the time of acquisition of the modulated light image data has been described. In the embodiment, however, a case in which the FD gain is reduced at the time of acquisition of the modulated light image data will be described with reference to FIG. 14. Differences from the first embodiment will be described and similar factors to those of the first embodiment will be omitted. For omission of the description, the same applies to embodiments to be described below.

Figure 14:
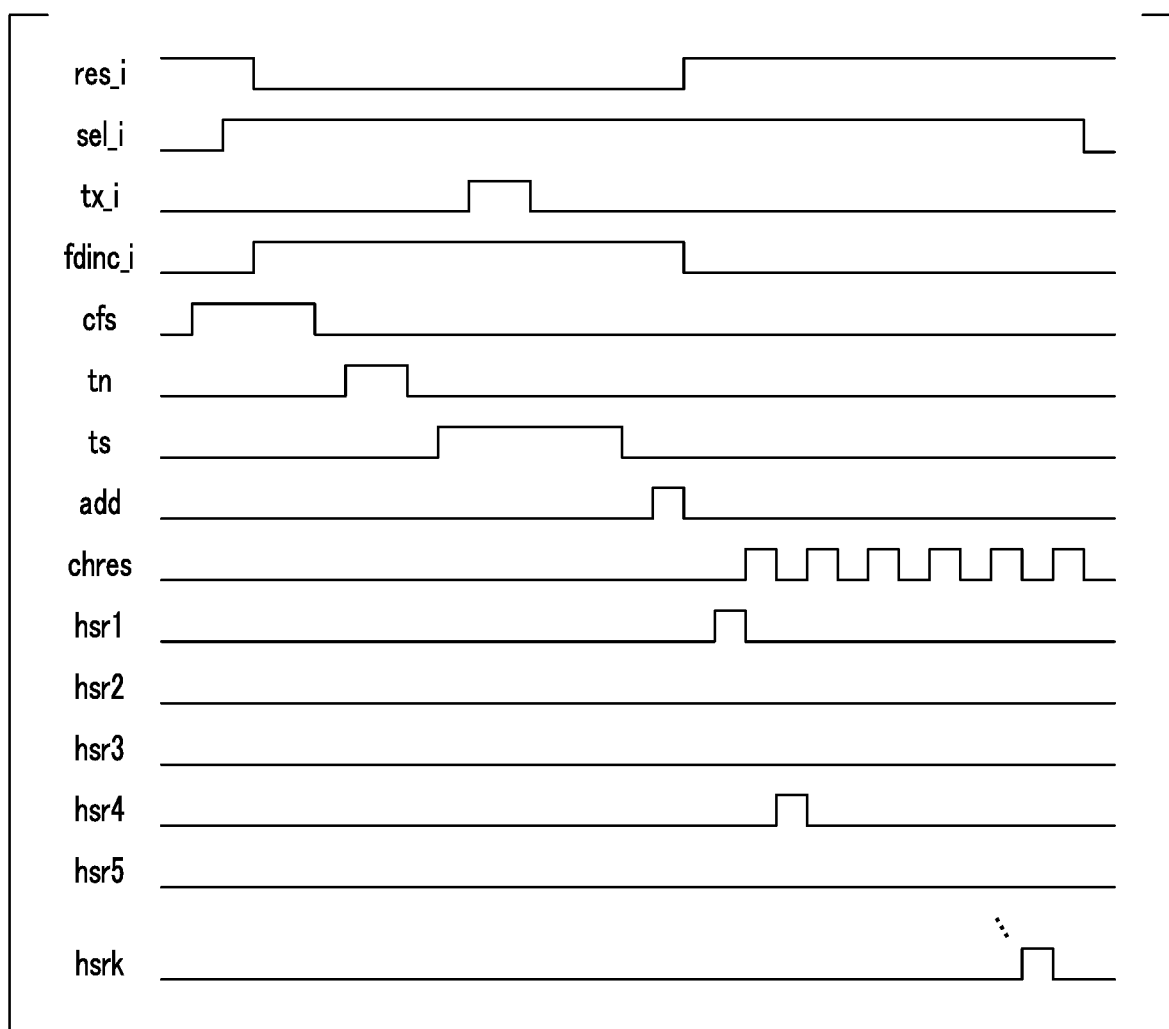
FIG. 14 is a timing chart illustrating a reading operation of 1H according to a second embodiment.

FIG. 14 is a timing chart illustrating a reading operation of the image sensor 107 at the time of acquisition of modulated light image data 1 and modulated light image data 2. Only the signal fdinc_i which is a difference between FIGS. 11C and 13C will be described.

In the embodiment, in a case of either low ISO sensitivity setting or high ISO sensitivity, the level of the signal fdinc_i is set to the high level when the signal is multiplied by two different kinds of gains for each row. For any row, the CPU 109 sets the level of the signal fdinc_i to the high level via the TG 113 to turn on the FDinc switch 307. Thus, the additional capacitors 308 and the FD units 303 enter a connection state. Thereafter, the pixel signals are read at the same timing as a timing indicating the reading operation of the image sensor 107 in the LV photographing illustrated in FIG. 11B.

In the embodiment, when the pixel signals from the pixel array of the modulated light image data is read once, an image signal output multiplied by a plurality of different kinds of gains can be obtained. By connecting the additional capacitors to the FD units, it is possible to increase the number of saturated electrons in the low ISO sensitivity setting. It is possible to expand the DR of the image signal output obtained by one-time exposure and expand the DR of the still image photographing or the LV photographing.

Third Embodiment

Figure 15:
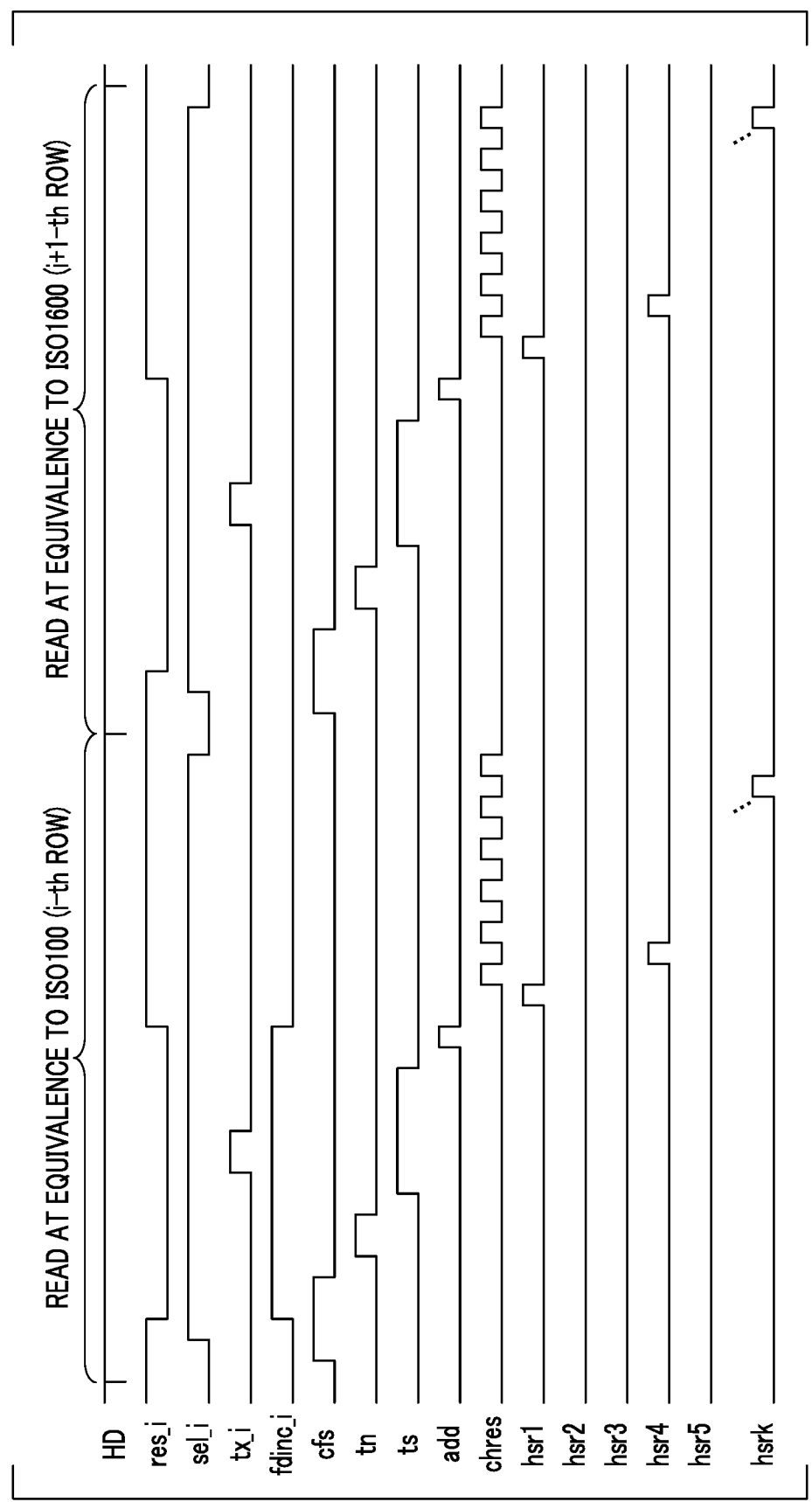
FIG. 15 is a timing chart illustrating a reading operation of 2H according to a third embodiment.

Next, a third embodiment of the invention will be described. In the first and second embodiments, the case in which the FD gain is fixed at the time of acquisition of the modulated light image data has been described. In the embodiment, a case in which the FD gain is set to be variable at the time of acquisition of the modulated light image data will be described with reference to FIG. 15. A horizontal synchronization signal (referred to as an HD) is added to the timing chart of FIG. 15. In reading of an i-th row indicated by the horizontal synchronization signal HD, signal reading at a gain equivalent to ISO100 is performed. In subsequent reading of an i+1-th row, signal reading at a gain equivalent to ISO1600 is performed.

When the pixel signals of the i-th row are read at the gain equivalent to ISO100, the CPU 109 first asserts the horizontal synchronization signal HD corresponding to a reading period equivalent to one row. Subsequently, the CPU 109 sets the level of the signal cfs (see FIG. 4) to the high level via the TG 113 to turn on the switches 404 and short-circuits both ends of the feedback capacitors 402. Subsequently, the CPU 109 sets the level of the signal sel_i to the high level via the TG 113 to turn on the pixel selection switches 306 of the pixels in the i-th row. Thereafter, the CPU 109 sets the level of the signal res_i (see FIG. 3) to the low level to turn off the FD reset switches 305 and releases the reset of the FD units 303. At this time, the CPU 109 sets the level of the signal fdinc_i to the high level via the TG 113 to turn on the FDinc switches 307 and connects the additional capacitors 308 to the FD units 303.

Thereafter, the CPU 109 sets the level of the signal cfs to the low level via the TG 113 to turn off the switches 404 and clamps a voltage of the vertical output line 202 after the reset releasing of the FD units 303 to the clamp capacitors 401 (the electrostatic capacitance C1).

Subsequently, the CPU 109 sets the level of the signal tn to the high level via the TG 113 to turn on the N signal transfer switches 406 and retain an N signal in the N signal retention capacitor 408. Subsequently, the CPU 109 sets the level of the signal tn to the low level via the TG 113 to turn off the N signal transfer switches 406. Thereafter, the CPU 109 sets the level of the signal ts to the high level to turn on the S signal transfer switches 405 and sets the level of the signal tx_i to the high level to turn on the transfer switches 302.

Through this operation, the signals stored in the PDs 301 in the i-th row selected at the current time point are output to the vertical output lines 202 via the FD amplifiers 304 and the pixel selection switches 306. The signals are retained in the S signal retention capacitors 407 via the operational amplifiers 403 and the S signal transfer switches 405.

Subsequently, the CPU 109 sets the levels of the signals tx_i and ts to the low level via the TG 113 to turn off the transfer switches 302 and the S signal transfer switches 405. Thereafter, the CPU 109 sets the level of the signal res_i to the high level to turn on the FD reset switches 305 and resets the FD unit 303. Through the operation until here, an operation of storing the S signal and the N signal in the i-th row in the S signal retention capacitor 407 and the N signal retention capacitor 408 ends.

After the S signal is retained in the S signal retention capacitors 407 and before an operation of the horizontal scanning circuit 207 starts, the CPU 109 temporarily sets the level of the signal add to the high level via the TG 113. Thus, the S signal addition switches 409 and the N signal addition switches 410 are turned on. Thereafter, the CPU 109 turns off the S signal addition switches 409 and the N signal addition switches 410 by returning the level of the signal add to the low level via the TG 113. Through this operation, the signals retained in the S signal retention capacitors 407 and the N signal retention capacitors 408 in each column are added and averaged with the signals in each addition target column.

Subsequently, an operation of outputting the S signal and the N signal retained in the S signal retention capacitor 407 and the N signal retention capacitor 408 from the image sensor 107 is performed. First, the CPU 109 turns on the horizontal transfer switches 205 and 206 by setting the level of the output hsr1 of the horizontal scanning circuit 207 to the high level. Then, the signals retained in the S signal retention capacitor 407 and the N signal retention capacitor 408 are output to the output terminal 211 via the horizontal output lines 208 and 209 and the differential amplifier 210.

When the CPU 109 drives the horizontal scanning circuit 207, the horizontal scanning circuit 207 limits the number of pixels in the horizontal direction and performs the reading, for example, by setting the selected signals to the high level at the period of 1 column from 3 columns for example, in the state of hsr1, hsr4, hsr7, . . . , and the like. While the signals in each column are read in accordance with the signals hsr1 to hsrk, the CPU 109 turns on the horizontal output line reset switches 212 and 213 by setting the level of the signal chres to the high level. Thus, the levels of the horizontal output lines 208 and 209 are reset to the reset voltage V chres. Then, the reading operation equivalent to one row in the i-th row ends.

In subsequent row, that is, an i+1-th row corresponding to the subsequent horizontal synchronization signal HD, signal reading at a gain equivalent to ISO1600 is performed. In this case, the CPU 109 sets the level of the signal fdinc_i to the low level via the TG 113, turns off the FDinc switch 307, and sets the FD units 303 and the additional capacitors 308 to the non-connection state. Timings related to the other signals are the same as the timing indicating the operation in the previous row (the i-th row).

The signal reading operation of the image sensor 107 is performed by performing this operation in sequence in each reading target row.

In the embodiment, when the pixel signals are read once from the pixel array of the modulated light image data, an image signal output multiplied by the plurality of kinds of different gains can be obtained. By connecting the additional capacitors to the FD units, it is possible to expand the number of saturated electrons in the low ISO sensitivity setting. By not connecting the additional capacitors to the FD units, it is possible to reduce noise in the high ISO sensitivity setting. It is possible to expand the DR of the image signal output obtained by one-time exposure and expand the DR of the still image photographing or the LV photographing.

In the embodiment, the scheme of performing the reading of one row during the horizontal synchronization time (1 HD period) at the time of acquisition of the modulated light image data has been described. However, the number of rows in which the reading is performed for 1 HD period is not limited to one row and the reading can be performed in any number of rows. Further, in the embodiment, the example in which two different kinds of gains are set for each HD period has been described. Two different kinds of gains may be set every arbitrary number of HD periods.

In the foregoing embodiments, the dynamic range in accordance with an imaging condition can be ensured in the imaging device capable of performing the preliminary light emission before the main light emission and deciding the amount of main emitted light. In the foregoing embodiments, the example in which the switch element which connects or does not connect the FD unit to the additional capacitor serving as the capacitance varying unit are used has been described. The invention is not limited thereto and the capacitance varying unit may include an election unit that selects any of two or more additional capacitors for the FD unit and may switch a plurality of gains.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-158250, filed Aug. 27, 2018 which is hereby incorporated by reference wherein in its entirety.

What is claimed is:

1. An imaging device that causes a light emission unit to emit light and is able to perform imaging using an image sensor, the imaging device comprising:
  a capacitance variator configured to vary electrostatic capacitance with respect to a floating diffusion unit included in each pixel unit of the image sensor;
  an amplifier configured to perform amplification in accordance with a plurality of gains set in a pixel signal of a plurality of pixel units; and
  at least one processor and at least one memory functioning as:
  a control unit configured to control the light emission unit, the capacitance variator, and the amplifier, wherein the control unit performs first control such that, in light modulation in which preliminary light emission of the light emission unit is performed to perform photometry, the plurality of gains are decided in accordance with a gain based on electrostatic capacitance set by the capacitance variator and a gain set in the amplifier, the gains are changed for each region in which the pixel signal is read, and an image signal multiplied by the gains is output, and the control unit performs second control such that an image signal multiplied by gains decided in accordance with the gain based on the electrostatic capacitance set by the capacitance variator and the gain set in the amplifier is output when display or recording of the image signal output by the image sensor is performed.

2. The imaging device according to claim 1, wherein the control unit acquires a first image signal used for the light modulation under the first control and decides an amount of emitted light when the light emission unit is caused to emit light in imaging in accordance with the first image signals, and acquires a second image signal used for the display or the recording under the second control.

3. The imaging device according to claim 2, wherein the control unit performs control such that, in the first image signal, a first pixel signal acquired from a first reading region in the plurality of pixel units is multiplied by a first gain, and performs control such that a second pixel signal read from a second reading region different from the first reading region is multiplied by a second gain.

4. The imaging device according to claim 3, wherein the capacitance variator includes
an additional capacitor for the floating diffusion unit, and
a selector configured to select a first state in which the additional capacitor is connected to the floating diffusion unit and a second state in which the additional capacitor is not connected to the floating diffusion unit.

5. The imaging device according to claim 4, wherein the control unit controls the selector to change a connection state between the floating diffusion unit and the additional capacitor between when the first image signal is acquired and when the second image signal is acquired.

6. The imaging device according to claim 5, wherein, when the first image signal is acquired, the control unit controls the selector to select the second state and performs control to set the gains with regard to the amplifier.

7. The imaging device according to claim 5, wherein, when the second image signal is acquired, the control unit controls the selector to select the first or second state and performs control to set the gains with regard to the amplifier.

8. The imaging device according to claim 4, wherein the control unit performs control such that the selector is controlled to select the first state and the first pixel signal is multiplied by the first gain when the first pixel signal is read in the first image signal, and performs control such that the selector is controlled to select the second state and the second pixel signal is multiplied by the second gain when the second pixel signal is read.

9. The imaging device according to claim 8, wherein the control unit performs control such that the first pixel signal is read from a first row in the plurality of pixel units and the second pixel signal is read from a second row.

10. The imaging device according to claim 5,
wherein the image sensor includes the capacitance variator and the amplifier, and
wherein the control unit performs control such that the selector is controlled to set the first state when imaging sensitivity is set to be lower than a threshold and the second image signal is acquired, and the selector is controlled to set the second state when the imaging sensitivity is set to be equal to or greater than the threshold and the second image signal is acquired.

11. A control method performed in an imaging device that causes a light emission unit to emit light and is able to perform imaging using an image sensor, the method comprising:
a first control process in which a plurality of gains are decided in accordance with a gain based on setting of a capacitance variator that varies electrostatic capacitance with respect to a floating diffusion unit included in a pixel unit of the image sensor in light modulation in which preliminary light emission of the light emission unit is performed to perform photometry and a gain set in an amplifier that amplifies a pixel signal of the pixel unit, the gains are changed for each region in which the pixel signal is read, and an image signal multiplied by the gains is output; and
a second control process in which an image signal multiplied by gains decided in accordance with the gain based on the electrostatic capacitance set by the capacitance variator and the gain set in the amplifier is output when display or recording of the image signal output by the image sensor is performed.

* * * * *